US008254979B2

(12) United States Patent
Kikuchi

(10) Patent No.: US 8,254,979 B2
(45) Date of Patent: Aug. 28, 2012

(54) COMMUNICATION SYSTEM, RADIO COMMUNICATION APPARATUS, AND COMMUNICATION METHOD

(75) Inventor: Shingo Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 490 days.

(21) Appl. No.: 12/496,126

(22) Filed: Jul. 1, 2009

(65) Prior Publication Data

US 2010/0004017 A1   Jan. 7, 2010

(30) Foreign Application Priority Data

Jul. 4, 2008 (JP) .................................. 2008-175465

(51) Int. Cl.
*H04B 7/00* (2006.01)
(52) U.S. Cl. .......................................... 455/522; 455/69
(58) Field of Classification Search .................. 455/522, 455/101, 127.1, 67.11, 423, 69, 572, 226.1, 455/63.1; 370/203; 375/260
See application file for complete search history.

(56) References Cited

U.S. PATENT DOCUMENTS

| 2003/0119452 | A1* | 6/2003 | Kim et al. .................. 455/69 |
| 2004/0063406 | A1* | 4/2004 | Petrus et al. ............... 455/67.11 |
| 2005/0213682 | A1 | 9/2005 | Han et al. |
| 2008/0214128 | A1* | 9/2008 | Lim et al. ................... 455/101 |
| 2008/0261535 | A1* | 10/2008 | Weil et al. .................. 455/67.11 |
| 2008/0267056 | A1* | 10/2008 | Aryanfar et al. ............ 370/203 |
| 2008/0274727 | A1* | 11/2008 | Axnas et al. ................ 455/423 |

FOREIGN PATENT DOCUMENTS

| JP | 2005057497 A | 3/2005 |
| WO | 0239618 A | 5/2002 |
| WO | 2005004376 A | 1/2005 |

OTHER PUBLICATIONS

European Search Report for EP 09 00 8772 completed Oct. 19, 2009.
S. Nagaraj et al., "Multiple Antenna Transmission With Channel State Informaton: A Low-Rate Feedback Approach", IEEE Signal Processing Letters, vol. 11, No. 6, Jun. 2004, pp. 573-576, XP011113217.
"PDCCH Content and Formats", Texas Instruments, 3GPP TSG RAN WG1 51bis, Sevilla, Spain, Jan. 14-18, 2008, [online], [search conducted on May 26, 2008], Internet URL: http://www.quintillion.co.jp/3GPP/TSG_RAN/TSG_RAN2008/TSG_RAN_WG1_RL1_1.htmlURL:URL:http://www.quintillion.co.jp/3GPP/TSG_RAN/TSG_RAN2008/TSG_RAN_WG1_RL1_1.html.
K. Tachikawa, "W-CDMA Mobile Communication System", Maruzen Co., Ltd, Publishing Division, Jun. 25, 2001, p. 53-55, p. 127-129.

* cited by examiner

*Primary Examiner* — Lana N Le
*Assistant Examiner* — Golam Sorowar

(57) ABSTRACT

A communication system includes a first radio communication apparatus and a second radio communication apparatus that includes multiple antennas. The first radio communication apparatus receives transmission signals transmitted from multiple antennas as reception signals, acquires a predetermined parameter for each antenna based on the reception signals, creates control information for causing the second radio communication apparatus to control transmission signals so that the parameter becomes a predetermined target value for each antenna, compares absolute values of differences between each acquired parameter and the target value, and transmits control information corresponding to the reception signal for which the absolute value is large to the second radio communication apparatus with priority over control information corresponding to the reception signal for which the absolute value is small. The second radio communication apparatus receives control information from the first radio communication apparatus and controls transmission signals for each antenna according to the control information.

18 Claims, 32 Drawing Sheets

| SIR MEASUREMENT DATA ||||
| TERMINAL ID | ANTENNA NUMBER | SIR MEASUREMENT VALUE (dB) | MEAN SIR MEASUREMENT VALUE (dB) |
| --- | --- | --- | --- |
| 20 | 201 | −10 | −12 |
|  | 202 | −20 |  |
|  | 203 | −10 |  |
| 21 | 211 | −1 | −3 |
|  | 212 | −2 |  |
|  | ⋮ | ⋮ |  |
| ⋮ | ⋮ | ⋮ | ⋮ |

SIR TARGET DATA

| TERMINAL ID | ANTENNA NUMBER | SIR MEASUREMENT VALUE (dB) |
|---|---|---|
| 20 | 201 | −10 |
|  | 203 | −10 |
|  | 203 | −10 |
| 21 | 211 | −15 |
|  | 212 | −15 |
|  | ⋮ | ⋮ |
| ⋮ | ⋮ | ⋮ |

PRIORITY SETTING DATA

| ANTENNA NUMBER | SIR DIFFERENCE | ANTENNA PRIORITY |
|---|---|---|
| 201 | 0 | 2 |
| 202 | 10 | 1 |
| 203 | 0 | 3 |
| 211 | −14 | 1 |
| 212 | −13 | 2 |
| 213 | −10 | 3 |
| ⋮ | ⋮ | ⋮ |

Fig.8

TPC COMMAND ALLOCATION TABLE  159

| TERMINAL ID | ANTENNA PRIORITY | TRANSMITTING ANTENNA NUMBER | TPC COMMAND |
|---|---|---|---|
| 20 | 1 | 202 | +10dB |
| 20 | 2 | 201 | 0dB |
| 21 | 1 | 211 | −14dB |
| 21 | 2 | 212 | −13dB |
| 22 | − | − | − |
| 22 | − | − | − |
| 23 | 1 | 231 | −3dB |
| 23 | − | − | − |
| ... | ... | ... | ... |

| BLER TARGET DATA | | |
|---|---|---|
| TERMINAL ID | ANTENNA NUMBER | BLER TARGET VALUE |
| 20 | 201 | 0.03 |
|  | 202 | 0.01 |
|  | 203 | 0.02 |
| 21 | 211 | 0.01 |
|  | 213 | 0.02 |
|  | ⋮ | ⋮ |
| ⋮ | ⋮ | ⋮ |

Fig.22

| EXAMPLE OF COMBINATION OF MCS NUMBERS | | | |
|---|---|---|---|
| MCS NUMBER | MODULATION SCHEME | CODING RATE | TRANSFER RATE (Mb/S) |
| 1 | QPSK | 1/8 | 1.891 |
| 2 | QPSK | 1/4 | 7.6 |
| 3 | QPSK | 1/2 | 3.793 |
| 4 | QPSK | 2/3 | 10.13 |
| 5 | 16QAM | 1/2 | 15.22 |
| 6 | 16QAM | 2/3 | 20.29 |
| 7 | 64QAM | 1/2 | 22.83 |
| 8 | 64QAM | 2/3 | 30.45 |
| ⋮ | ⋮ | ⋮ | ⋮ |

| PRIORITY SETTING DATA | | |
|---|---|---|
| ANTENNA NUMBER | MCS DIFFERENCE | ANTENNA PRIORITY |
| 201 | 2 | 1 |
| 202 | 1 | 2 |
| 203 | 0 | 3 |
| 211 | 1 | 2 |
| 212 | 1 | 2 |
| 213 | 0 | 3 |
| ⋮ | ⋮ | ⋮ |

| MCS CONTROL COMMAND ALLOCATION TABLE ||||
|---|---|---|---|
| TERMINAL ID | ANTENNA PRIORITY | TRANSMITTING ANTENNA NUMBER | MCS CONTROL COMMAND |
| 20 | 1 | 201 | 5 |
|  | 2 | 202 | 5 |
| 21 | 1 | 211 | 4 |
|  | 2 | 213 | 3 |
| 22 | — | — | — |
|  | — | — | — |
| 23 | 1 | 231 | 3 |
|  | — | — | — |
| ⋮ | ⋮ | ⋮ | ⋮ |

COMMUNICATION SYSTEM, RADIO COMMUNICATION APPARATUS, AND COMMUNICATION METHOD

This application is based upon and claims the benefit of priority from Japanese Patent Application No. 2008-175465 filed on Jul. 4, 2008, the content of which is incorporated by reference.

BACKGROUND OF THE INVENTION

1. Field of the Invention

The present invention relates to technology that improves communication quality in a communication system that widens a band per mobile communication device by combining a plurality of antennas.

2. Description of the Related Art

A so-called "far-near problem" occurs in mobile radio communication systems. This problem occurs when all terminals output radio waves with the same transmit power regardless of the distance of the terminals from a base station, and as a result the radio waves of a terminal that is near to the base station become too strong and it is not possible to separate the radio waves from a terminal that is far from the base station.

To solve the far-near problem and also to save on transmit power, TPC (Transmit Power Control) technology is used in which a base station controls the transmit power of an antenna of each terminal based on a power of the reception signals that is received from each terminal.

As disclosed in "Texas Instruments Source, "3GPP TSG RAN WG1 51bis Sevilla", [online], 14 Jan. 2008, [search conducted on 26 May, 2008], Internet URL: http://www.quintillion.co.jp/3GPP/TSG_RAN/TSG_RAN2008/TSG_RAN_WG1_RL1__1.html" (hereunder, referred to as "Non-patent Document 1"), according to the TPC technology each terminal outputs a signal for SIR measurement to cause a base station to measure a signal to interference power ratio (SIR). The base station receives the signals for SIR measurement and calculates SIRs that correspond to the respective antennas. Subsequently, the base station determines differences between a predetermined SIR target value and the calculated SIRs, and generates TPC commands that indicate a transmit power control amount for each antenna so as to reduce the differences.

As described in "W-CDMA Mobile Communication System", edited by Keiji Tachikawa, Maruzen Co., Ltd, Publishing Division, 25 Jun. 2006, pp. 53-55, pp. 127-129" (hereunder, referred to as "Non-patent Document 2"), for example, this TPC command is notified at intervals of one millisecond or the like to the terminal from the base station through a field provided for notifying UL (Up Link) information in a PDCCH (Physical Downlink Control Channel).

In an MIMO (Multiple Input Multiple Output) system in which a terminal is provided with a plurality of antennas, as disclosed in Japanese Patent Laid-Open No. 2005-57497 (hereunder, referred to as "Patent Document 1"), a base station determines a total value of assessment values based on an SIR of each antenna for each combination of the transmit powers of each antenna. By controlling the transmit power of each antenna so as to minimize the total value, the base station can improve the communication quality. Further, an MIMO system disclosed in International Patent Application No. WO 2005/004376 pamphlet (hereunder, referred to as "Patent Document 2") uses a base station to determine the existence/non-existence of errors in a data stream for each antenna. When an error exists, the MIMO system retransmits the relevant data to the terminal to thereby improve the communication quality.

However, even in the MIMO systems disclosed in Patent Documents 1 and 2, there are cases in which the communication quality declines.

More specifically, when controlling a plurality of antennas, the number of TPC commands to be transmitted within a predetermined period increases in proportion to the number of antennas. Therefore, in order to be able to transmit a TPC command to all antennas, the base station transmits a radio frame including a TPC command for each antenna by time division.

However, when the number of antennas is too great with respect to the communication speed, even when transmission is performed using time division it is not possible to transmit a TPC command to all antennas within a TPC update period (for example, 2 milliseconds).

For example, in a case in which a TPC command is updated every two milliseconds and a TPC command is transmitted every one millisecond to three antennas, respectively, the TPC command can be transmitted to only two of the three antennas within the two milliseconds, and transmit power control of the remaining antenna is delayed.

Thus, because control of the transmit power is delayed on the transmitting side, it is difficult to separate the radio waves for each antenna on the receiving side, and there is the problem that the communication quality of the transmission channels corresponding to the antennas declines.

SUMMARY OF THE INVENTION

An exemplary object of the present invention is to provide technology that improves communication quality between a mobile communication device and a base station in an MIMO system.

To achieve the above object, according to an exemplary aspect of the invention, a radio communication system of the invention includes a first radio communication apparatus and a second radio communication apparatus that includes a plurality of antennas, wherein the first radio communication apparatus receives transmission signals that are transmitted from the plurality of antennas as reception signals, acquires a predetermined parameter for each of the antennas based on the reception signals, creates control information for causing the second radio communication apparatus to control the transmission signals so that the parameter becomes a predetermined target value for each of the antennas, compares absolute values of differences between the respective acquired parameters and the target value, and transmits the control information corresponding to the reception signal for which the absolute value is large to the second radio communication apparatus with priority over the control information corresponding to the reception signal for which the absolute value is small; and the second radio communication apparatus receives the control information from the first radio communication apparatus, and controls the transmission signal for each of the antennas in accordance with the control information.

A radio communication apparatus according to the invention includes receiver that receives transmission signals that are transmitted from a plurality of antennas comprised by another radio communication apparatus as reception signals; parameter acquisition means that acquires predetermined parameters based on the reception signals received by the reception means for each of the antennas; control information creator that creates, for each of the antennas, control information for causing the other radio communication apparatus to control the transmission signals so that the parameters acquired by the parameter acquirer become a predetermined target value; and transmitter that compares absolute values of differences between the respective parameters acquired by the parameter acquirer and the target value, and that transmits the control information corresponding to the reception signal for which the absolute value is large to the other radio communication apparatus with priority over the control information corresponding to the reception signal for which the absolute value is small. A communication method according to the invention is a communication method for a communication system comprising a first radio communication apparatus and a second radio communication apparatus that includes a plurality of antennas, wherein the first radio communication apparatus receives transmission signals that are transmitted from the plurality of antennas as reception signals, acquires a predetermined parameter for each of the antennas based on the reception signals, creates control information for causing the second radio communication apparatus to control the transmission signals so that the parameters become a predetermined target value for each of the antennas, and transmits the control information corresponding to the reception signal for which an absolute value of a difference between the parameter that is acquired and the target value is large to the second radio communication apparatus with priority over the control information corresponding to the reception signal for which the absolute value is small; and the second radio communication apparatus receives the control information from the first radio communication apparatus, and controls the transmission signals for each of the antennas in accordance with the control information.

BRIEF DESCRIPTION OF THE DRAWINGS

FIG. 3 is a view that shows an example of the structure of SIR measurement data according to the first exemplary embodiment;

FIG. 4 is a view that shows an example of the structure of SIR target data according to the first exemplary embodiment;

FIG. 6 is a view that shows an example of the structure of priority setting data according to the first exemplary embodiment;

FIG. 8 is a view that shows an example of the structure of a TPC command allocation table according to the first exemplary embodiment;

FIG. 16 is a view that shows an example of the structure of BLER target data according to the second exemplary embodiment;

FIG. 22 is a view that shows an example of MCS number settings according to the third exemplary embodiment;

FIG. 25 is a view that illustrates an example of the structure of priority setting data according to the third exemplary embodiment;

DETAILED DESCRIPTION OF THE PREFERRED EMBODIMENTS

First Exemplary Embodiment

Figure 1:
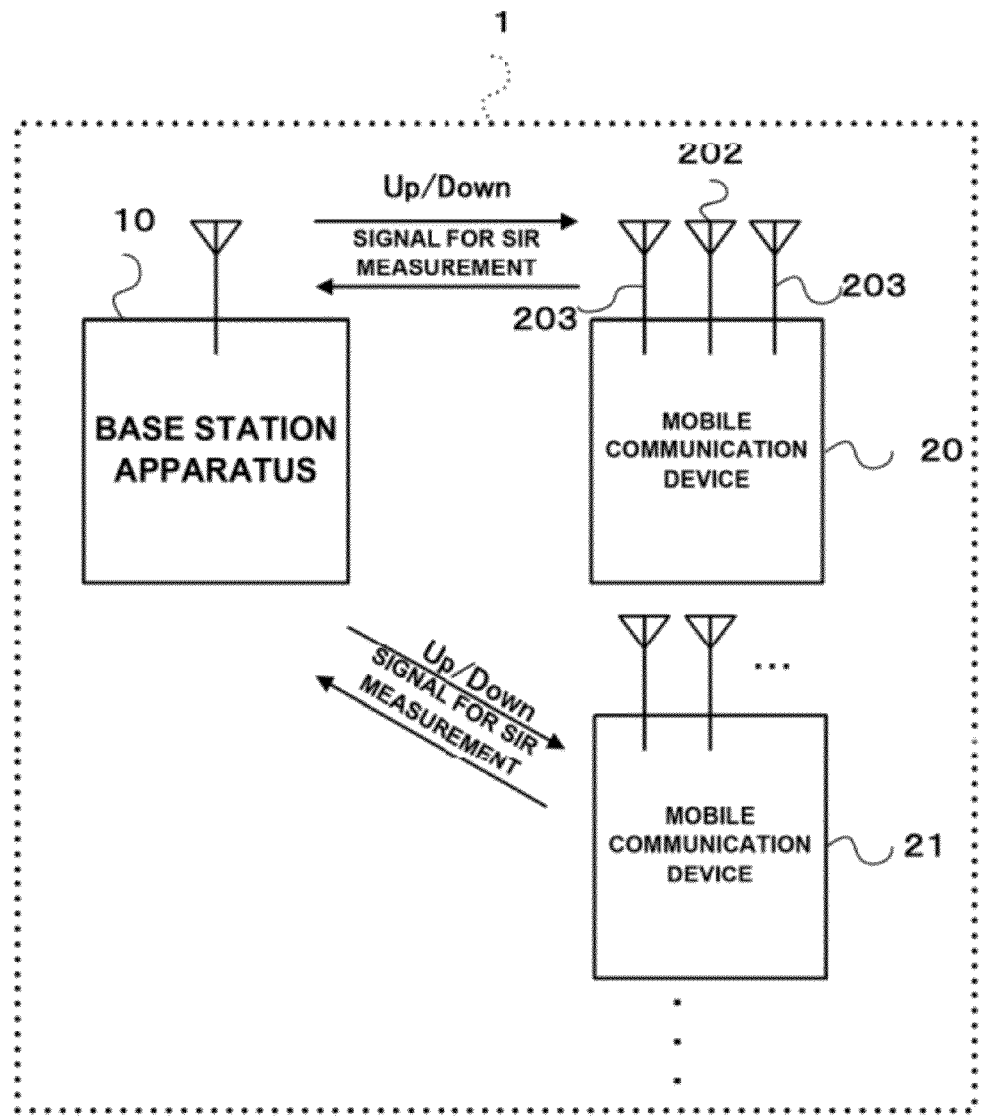
FIG. 1 is a block diagram that shows the configuration of an MIMO system according to a first exemplary embodiment.

A first exemplary embodiment for implementing the invention will now be described in detail referring to the drawings.

FIG. 1 is a block diagram that shows the configuration of MIMO system 1 according to the present exemplary embodiment. Referring to FIG. 1, MIMO system 1 includes base station apparatus 10 and a plurality of mobile communication devices (for example, 20 and 21).

Mobile communication devices 20 and 21 are devices that are capable of radio communication while moving, and for example, are mobile phones, PDAs (Personal Digital Assistants), or car navigation apparatuses. Mobile communication devices 20 and 21 respectively include a plurality of transmitting antennas (for example, antennas 201, 202, and 203), and transmit to base station apparatus 10 a signal for SIR measurement (transmission signal) for causing base station apparatus 10 to perform SIR measurement at predetermined periods (for example, 1 millisecond) via these antennas.

Base station apparatus 10 is a radio communication apparatus that is installed at a base station, and receives a signal for SIR measurement from mobile communication devices (20 and 21) as a reception signal. Base station apparatus 10 calculates an SIR based on the reception signal. In accordance with a difference between a calculated SIR and a target value, base station apparatus 10 transmits a TPC command even in a case in which the control amount, by which the transmit power of antenna will be increased or decreased, is different for each antenna.

Mobile communication devices 20 and 21 each include one or more receiving antennas. Mobile communication devices 20 and 21 receive TPC commands via these antennas, and increase or decrease the transmit power of an antenna in accordance with the received TPC command.

In this connection, in a case in which the total number of transmitting antennas of mobile communication devices in the entire MIMO system 1 is two or more, the number of mobile communication devices and the number of transmitting antennas of each mobile communication device is not limited to two, respectively.

Figure 2:
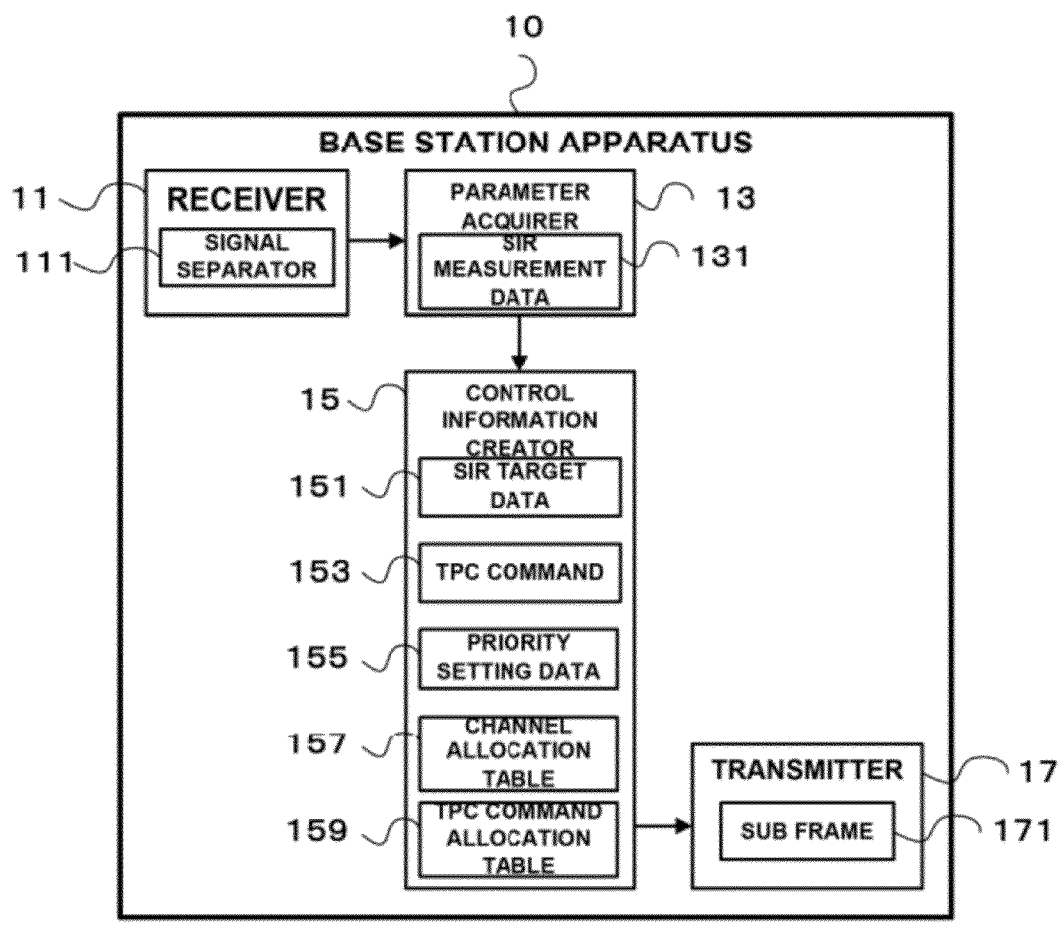
FIG. 2 is a block diagram that shows the configuration of a base station apparatus according to the first exemplary embodiment.

FIG. 2 is a block diagram that shows the configuration of base station apparatus 10. Referring to FIG. 2, base station apparatus 10 includes receiver 11, parameter acquirer 13, control information creator 15, and transmitter 17.

Receiver 11 includes signal separator 111. Signal separator 111 separates reception signals that base station apparatus 10 receives from mobile communication devices 20 and 21 into signals for SIR measurement corresponding to a plurality of antennas (antennas 201, 202, 203, and the like), respectively.

Parameter acquirer 13 measures an SIR that is a parameter used for transmit power control, from each signal that is separated by signal separator 111.

Each time parameter acquirer 13 receives a signal for SIR measurement, parameter acquirer 13 calculates an instantaneous value of the SIR for each antenna from the signal for SIR measurement. Further, parameter acquirer 13 calculates a time mean value of the SIR for each antenna by taking a time mean for a plurality of periods with a temporary filter using a forgetting factor based on SIR values that have been calculated up to the previous time and the instantaneous value that is calculated at the current time, and updates a time mean value of the SIR calculated at the previous time with the time mean value of the SIR that is calculated at the current time.

Parameter acquirer 13 also calculates a mean value for a mobile communication device of time mean values of SIRs that are calculated for each antenna.

Parameter acquirer 13 stores information that shows the calculated SIR for each mobile communication device and each antenna as SIR measurement data 131. FIG. 3 shows an example of the structure of SIR measurement data 131. As shown in FIG. 3, SIR measurement data 131 includes information that shows a "terminal ID", "antenna number", "individual SIR measurement value", and "mean SIR measurement value".

The "terminal ID" is a number that is uniquely allocated to each mobile communication device (20 and 21). The "antenna number" is a number that is uniquely allocated to each antenna (201, 202, 203, and the like). The "individual SIR measurement value" is a time mean value of an SIR that is calculated for each antenna. The "mean SIR measurement value" is a mean value of SIRs that are calculated for each mobile communication device. The unit of the "individual SIR measurement value" and the "mean SIR measurement value" is, for example, decibels (dB).

For example, a case will be considered in which, based on reception signals from antennas denoted by antenna numbers "201", "202", and "203", the "individual SIR measurement values" of "−10 (dB)", "−20 (dB)" and "−10 (dB)" are calculated, respectively. In this case, the "mean SIR measurement value" of the terminal denoted by terminal ID "20" is approximately "−12 (dB)".

Returning to FIG. 2, control information creator 15 stores SIR target data 151 that shows an SIR target value for each antenna. Subsequently, at predetermined periods (hereunder, referred to as "TPC update period"), control information creator 15 creates and stores TPC command 153 that designates controlling the amount of a transmit power for making an SIR measurement value equal to a target value for each antenna. The TPC update period is longer than a transmission period of a signal for SIR measurement. For example, when a transmission period of a signal for SIR measurement is one millisecond, the TPC update period is set as two milliseconds.

FIG. 4 is a view that illustrates an example of the structure of SIR target data 151. Referring to FIG. 4, SIR target data 151 includes information that shows a "terminal ID", "antenna number", and "SIR target value".

The "terminal ID" is a number that is uniquely allocated to each mobile communication device. The "antenna number" is a number that is uniquely allocated to each antenna. The "SIR target value" is a target value for an SIR for each antenna.

Figure 5:
FIG. 5 is a view that shows an example of the structure of a TPC command according to the first exemplary embodiment.

FIG. 5 is a view that illustrates an example of the structure of TPC command 153. Referring to FIG. 5, TPC command 153 includes information that shows a "terminal ID", "antenna number", and "control amount".

The "terminal ID" is a number that is uniquely allocated to each mobile communication device. The "antenna number" is a number that is uniquely allocated to each antenna. For the "control amount", an amount by which the transmit power is to be increased or decreased is set for each antenna. The unit of the "control amount" is, for example, decibels (dB).

In this connection, TPC command 153 is assumed to be control information that designates a control amount of a transmit power. However, TPC command 153 may also be control information that designates a target value of a transmit power or as a command bit that designates an increase or decrease in a transmit power.

Returning to FIG. 2, control information creator creates priority setting data 155 in accordance with an absolute value of a difference between the SIR measurement value and the target value for each antenna in the TPC update period.

Priority setting data 155 is information that shows the priority for each antenna for transmission of control information.

FIG. 6 shows an example of the structure of priority setting data 155. Referring to FIG. 6, priority setting data 155 includes information that shows an "antenna number", "SIR difference", and "antenna priority".

The "antenna number" is a number that is uniquely allocated for each antenna. The "SIR difference" is an absolute value of the difference between an individual SIR measurement value and a target value that is calculated for each antenna. The "antenna priority" indicates the priority for each antenna with respect to a single mobile communication device, and the smaller the numerical value is for "antenna priority", the higher is the priority of the relevant antenna. Regarding the "antenna priority", the larger the "SIR difference" of an antenna is, the higher is the priority that is set for that antenna.

For example, if the "SIR differences" of antennas denoted by "antenna numbers" 201, 202, and 203 are 0, 10, and 0, respectively, the "antenna priority" of "antenna number" 201 is set as 2, the "antenna priority" of "antenna number" 202 is set as 1, and the "antenna priority" of "antenna number" 203 is set as 3. The larger the control amount of an antenna, the higher is the priority that is set for that antenna. When a control amount is the same for two or more antennas, the smaller the antenna number of an antenna, the higher is the priority that is set for that antenna.

Returning to FIG. 2, control information creator 15 creates channel allocation table 157 based on mean values of the SIRs of each mobile communication device in the TPC update period.

Channel allocation table 157 is a table that shows the correlation between channels that transmit control information and mobile communication devices.

Transmitter 17 that is described later transmits the TPC commands through a predetermined number of channels. However, if the number of channels is less than a number of mobile communication devices, control information creator 15 cannot allocate a channel for all mobile communication devices. In this case, control information creator 15 allocates channels for mobile communication devices based on the mean value of the SIR of each mobile communication device.

For example, Transmitter 17 may allocate channels by giving priority to a mobile communication device for which a mean value of the SIR of all antennas provided in the mobile communication device is small.

Figure 7:
FIG. 7 is a view that shows an example of the structure of a channel allocation table according to the first exemplary embodiment.

FIG. 7 is a view that shows an example of the structure of channel allocation table 157. Referring to FIG. 7, channel allocation table 157 includes information that shows a "channel number" and "terminal ID".

The "channel number" is a number that is allocated to a channel that transmits control information. The "terminal ID" is a number that is uniquely allocated to each mobile communication device.

For example, if four channels having the "channel numbers" 0 to 3 are provided, and the "terminal IDs" are 20, 21, 23, and 29 in order from the mobile communication device with the smallest SIR mean value, then the numbers 20, 21, 23, and 29 are allocated as "terminal IDs" with respect to "channel numbers" 0 to 3, respectively.

Returning to FIG. 2, control information creator 15 creates TPC command allocation table 159 in accordance with the priority for each antenna in the TPC update period.

In this case, transmitter 17 that is described later transmits TPC command 153 to each mobile communication device in a predetermined period that is shorter than the TPC update period, for example, a period in which channel allocation table 157 is updated (hereunder, referred to as "channel allocation table update period").

TPC command allocation table 159 is a table that shows antennas to be taken as objects for transmission of a TPC command in each channel allocation table update period (for example, 1 millisecond).

If channels are allocated to a mobile communication device in TPC command allocation table 159, transmitter 17 transmits in order from the TPC command of the antenna with the higher "antenna priority" of the mobile communication device.

More specifically, transmitter 17 transmits a TPC command of an antenna with a large absolute value for a difference between an individual SIR measurement value and a target value with priority over a TPC command of an antenna with a small absolute value for the difference.

FIG. 8 is a view that shows an example of the structure of TPC command allocation table 159. Referring to FIG. 8, TPC command allocation table 159 includes information showing a "terminal ID", "antenna priority", "transmitting antenna number", and "TPC command".

The "terminal ID" is a number that is uniquely allocated to each mobile communication device. The "antenna priority" is a priority for each antenna of a single mobile communication device. The "transmitting antenna number" is a number of an antenna that is taken as an object for transmission of a TPC command. The "TPC command" is information that shows an antenna number and a control amount by which the transmit power for each antenna will be increased or decreased.

For example, the "antenna priorities" of antennas 201, 202, and 203 of a terminal with a "terminal ID" 20 decrease in the order 202, 201, and 203. Therefore, the TPC commands for antennas denoted by "antenna numbers" 202 and 201 are transmitted in respective channel allocation table update periods (1 millisecond) in the TPC update period (2 milliseconds). The TPC command of the remaining antenna 203 is cancelled.

Since channels are not allocated in channel allocation table 157 to a mobile communication device with "terminal ID" 22, a TPC command is not transmitted to that mobile communication device. Since a mobile communication device with "terminal ID" 23 includes one antenna, a TPC command is transmitted thereto in the first channel allocation table update period (1 millisecond) of the TPC update period (2 milliseconds), and a TPC command is not transmitted in the remaining channel allocation table update period (1 millisecond).

Thus, by transmitting a TPC command of an antenna with a large absolute value with respect to a difference between an individual SIR measurement value and a target value with priority over a TPC command of an antenna with a small absolute value with respect to the difference, the transmit power control of each antenna is appropriately executed without a delay in the control of the antenna for which the control amount is large. Therefore, separation for each antenna of reception signals that are received from a mobile communication device is simplified, and the reception quality on the receiving side (10) improves. Further, a saving can be made in the transmit power of the antennas on the transmitting side (20 and 21).

Returning to FIG. 2, transmitter 17 adds information that shows the terminal ID in accordance with TPC command allocation table 159, and transmits sub frame 171 provided with an antenna field and a TPC field to each mobile communication device (20 and 21).

The format of a radio frame will now be described. Base station apparatus 10 transmits a radio frame at predetermined periods (for example, 10 milliseconds). The radio frame is time-divided into a plurality of sub frames at the channel allocation table update periods (1 millisecond). Control information corresponding to a plurality of channels is added to each sub frame. Information showing a terminal ID that indicates the mobile communication device that is the control object is added to the control information. The control information is also provided with an antenna field and a TPC field.

Information for identifying the antenna that is the control object is stored in the antenna field. A TPC command is stored in the TPC field.

Figure 9:
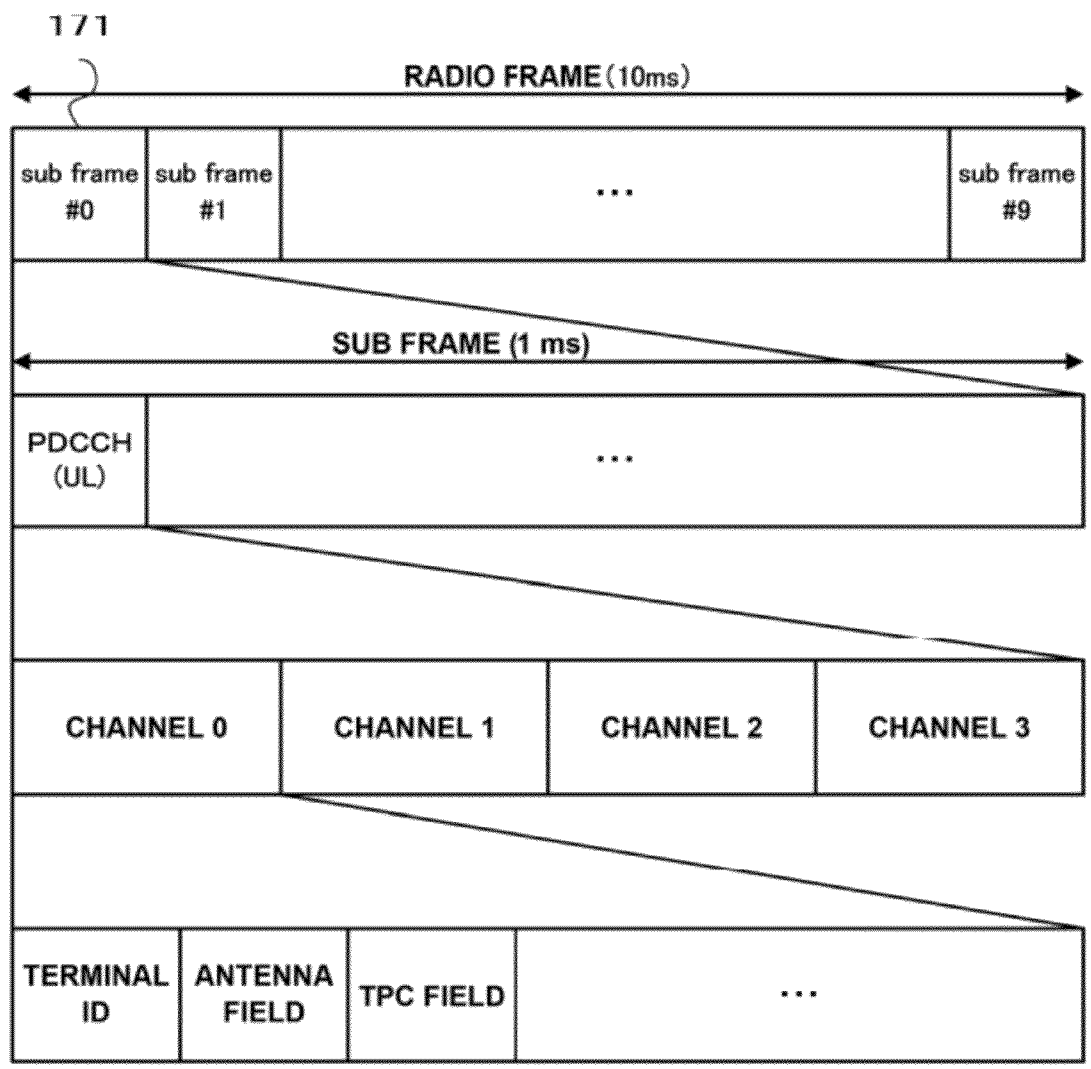
FIG. 9 is a view that shows the format of a radio frame according to the first exemplary embodiment.

FIG. 9 is a view that shows the format of a radio frame in MIMO system 1. Referring to FIG. 9, the radio frame is time-divided into ten sub frames comprising "sub frame #0" to "sub frame #9". In each sub frame is stored information that is transmitted through a PDCCH (Physical Downlink Control Channel) (UL: UpLink).

Information that is transmitted through the PDCCH is control information in the physical layer. MIMO system 1 can store control information corresponding to a plurality of channels. Control information that is transmitted through each channel includes an encoded terminal ID, antenna field, and TPC field.

Figure 10:
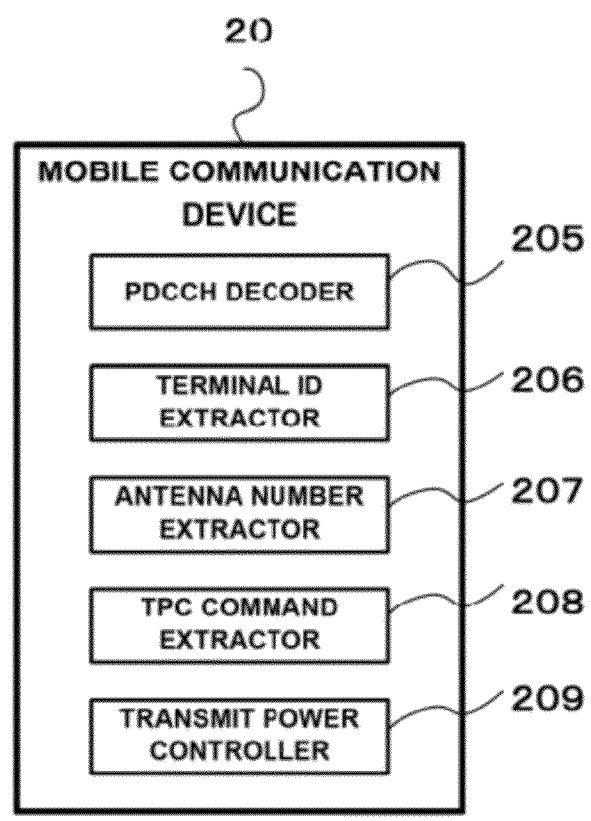
FIG. 10 is a block diagram that shows the configuration of a mobile communication device according to the first exemplary embodiment.
Figure 20:
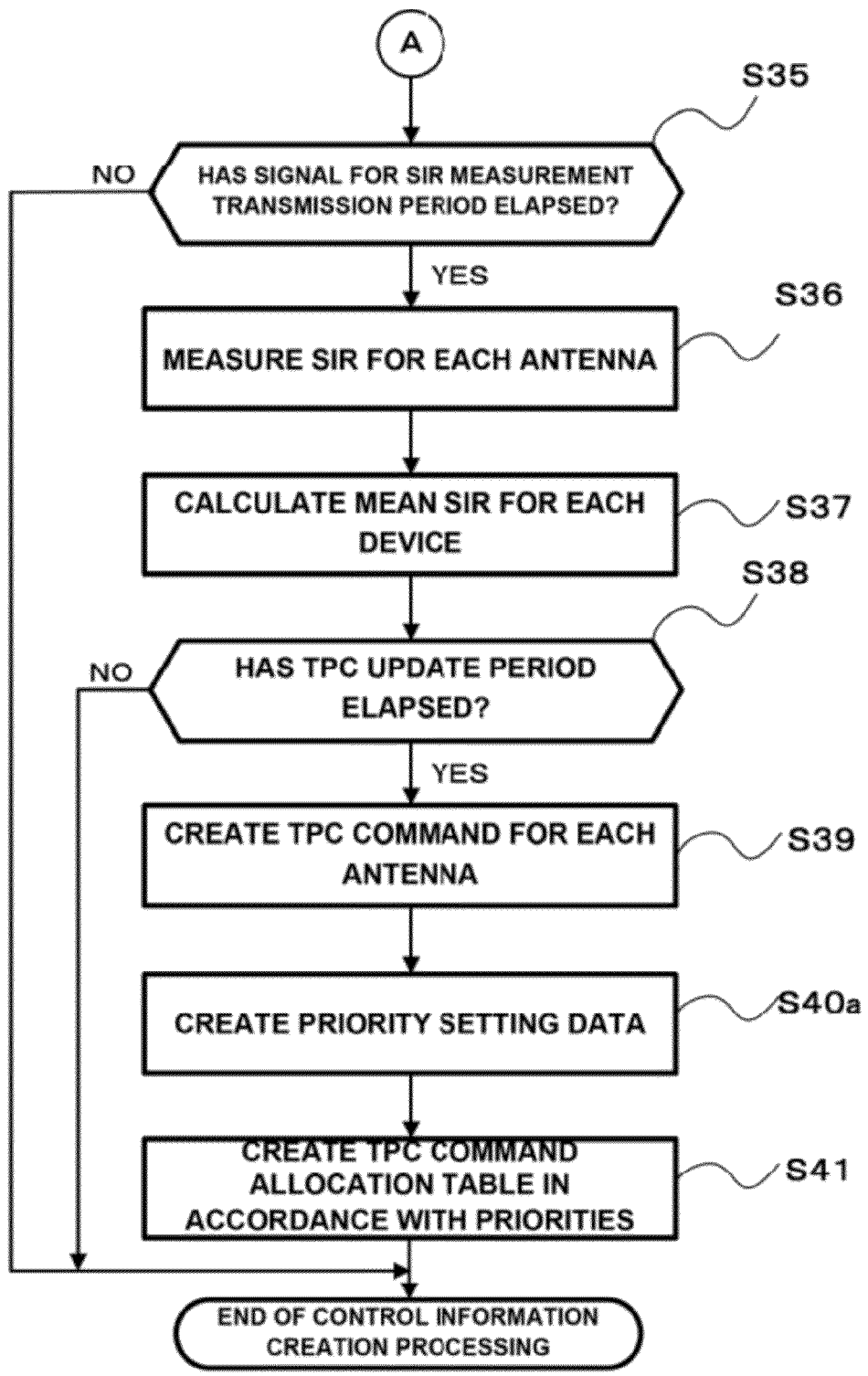
FIG. 20 is a flowchart that illustrates control information creation processing according to the second exemplary embodiment.

FIG. 10 is a block diagram that shows the configuration of mobile communication device 20. Referring to FIG. 20, mobile communication device 20 comprises PDCCH decoder 205, terminal ID extractor 206, antenna number extractor 207, TPC command extractor 208, and transmit power controller 209.

PDCCH decoder 205 decodes control information that is received from base station apparatus 10 via the PDCCH (UL). Terminal ID extractor 206 extracts information showing the terminal ID from the decoded control information and determines whether or not the terminal ID is an ID corresponding to mobile communication device 20.

If the terminal ID is an ID corresponding to mobile communication device 20, antenna number extractor 207 reads information corresponding to the antenna field from the decoded control information, and obtains the antenna number of the antenna that is the control object.

TPC command extractor 208 extracts information corresponding to the TPC field from the decoded control information, and extracts a TPC command for the antenna.

Transmit power controller 209 increases or decreases the transmit power of each antenna (201, 202, 203) in accordance with a TPC command for each antenna.

The configuration of mobile communication device 21 is the same as that of mobile communication device 20.

Figure 11:
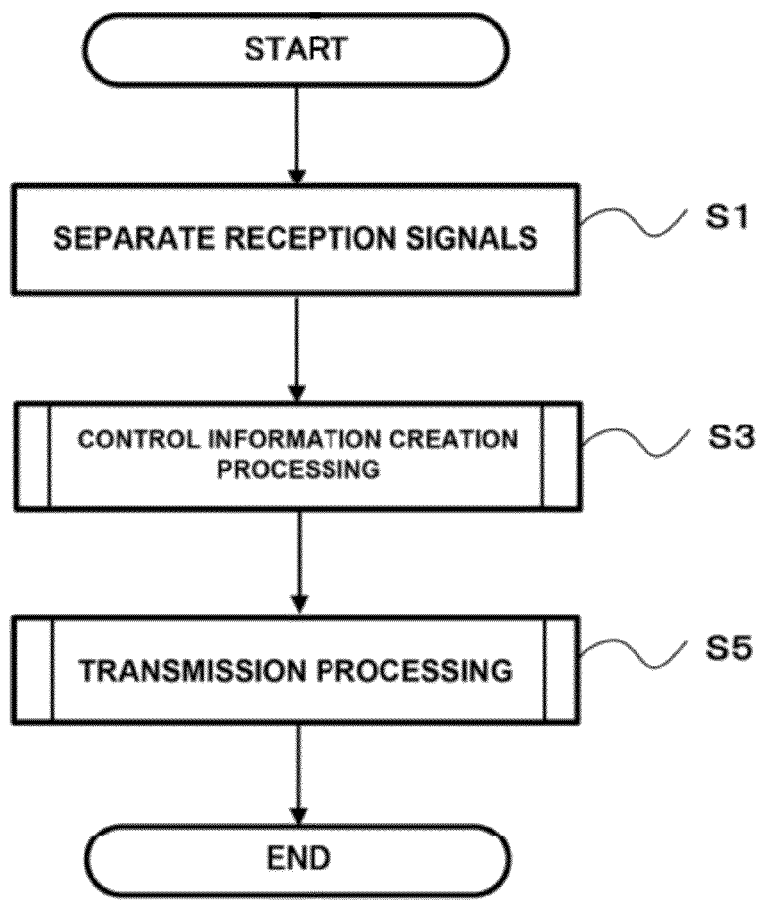
FIG. 11 is a flowchart that illustrates transmit power control processing according to the first exemplary embodiment.

Next, the operation of communication system 1 is described referring to FIG. 11 to FIG. 14. FIG. 11 is a flowchart that illustrates transmit power control processing executed by base station apparatus 10. The transmit power control processing commences when the power of base station apparatus 10 is turned on or when a predetermined application is executed.

In FIG. 11, signal separator 111 separates reception signals that are received from mobile communication devices 20 and 21 into respective signals for SIR measurement corresponding to each antenna (201, 202, and 203) (step S1).

Base station apparatus 10 executes control information creation processing (step S3). Transmitter 17 executes transmission processing (step S5). After step S5, base station apparatus 10 ends the transmit power control processing.

Figure 12:
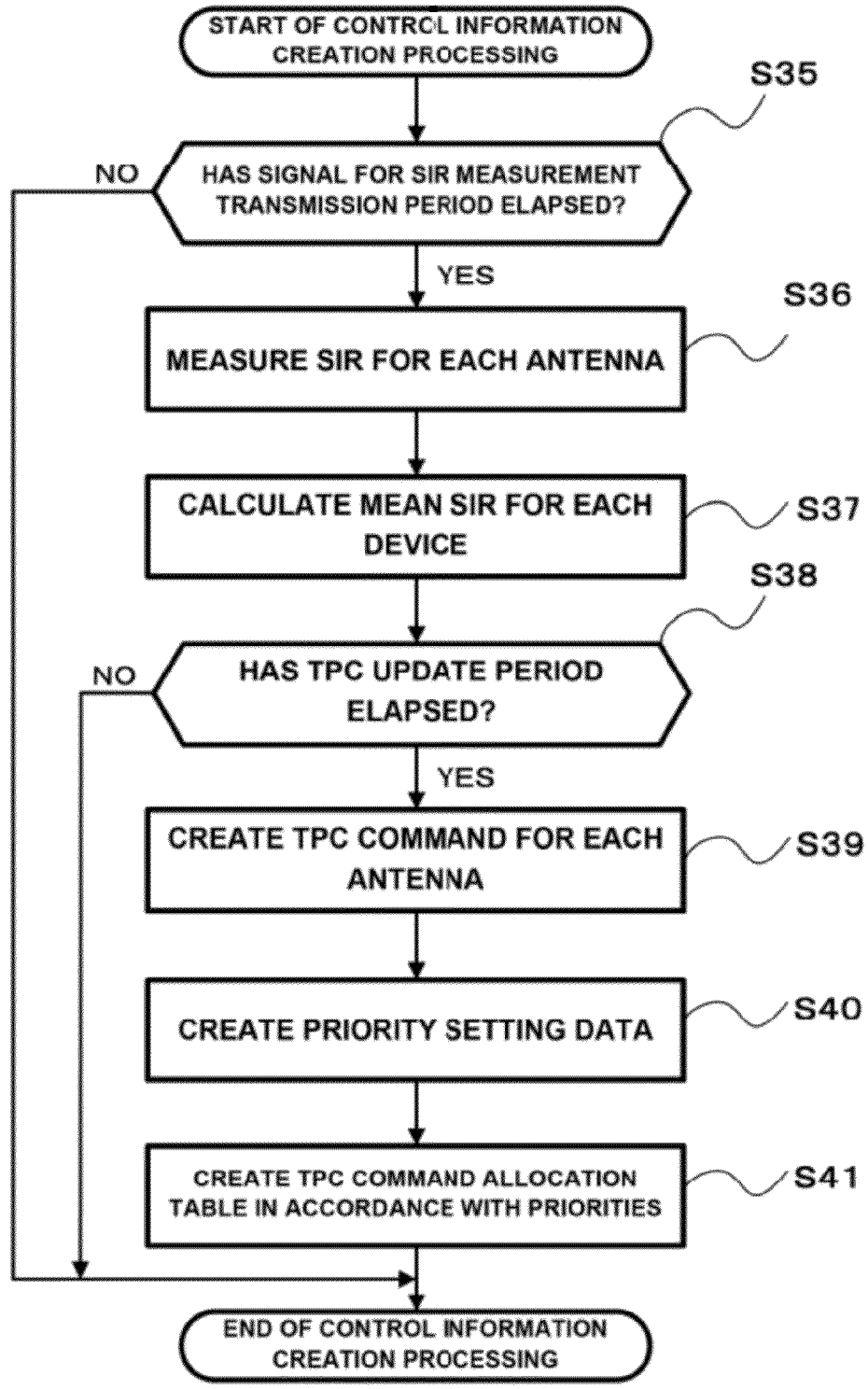
FIG. 12 is a flowchart that illustrates control information creation processing according to the first exemplary embodiment.

FIG. 12 is a flowchart that illustrates control information creation processing. Base station apparatus 10 determines whether or not a transmission period (1 millisecond) of a signal for SIR measurement has elapsed from a time that reception signals are initially separated or from a time of the previous measurement (step S35). If a transmission period of a signal for SIR measurement has elapsed (step S35: YES), parameter acquirer 13 calculates each of the individual SIR measurement values for each antenna based on the signals for SIR measurement (step S36), and calculates an SIR mean value for each mobile communication device (step S37).

Control information creator 15 determines whether or not a TPC update period (2 milliseconds) has elapsed (step S38). If a TPC update period has elapsed (step S38: YES), control information creator 15 determines the control amount by which the transmit power for each antenna will be increased or decreased in order to make an SIR measurement value equal to a target value. Control information creator 15 creates and stores TPC command 153 that designates the aforementioned control amount (step S39). Control information creator 15 sets a priority for each antenna in accordance with the absolute value of a difference between an individual SIR measurement value and a target value. Control information creator 15 creates and stores priority setting data 155 (step S40).

Control information creator 15 creates and stores TPC command allocation table 159 in accordance with "antenna priorities" shown by priority setting data 155 (step S41).

In a case in which the transmission period (1 millisecond) of a signal for SIR measurement has not elapsed (step S35: NO) or a TPC update period (2 milliseconds) has not elapsed (step S38: NO), or after step S41, base station apparatus 10 ends the transmit power control processing.

Figure 13:
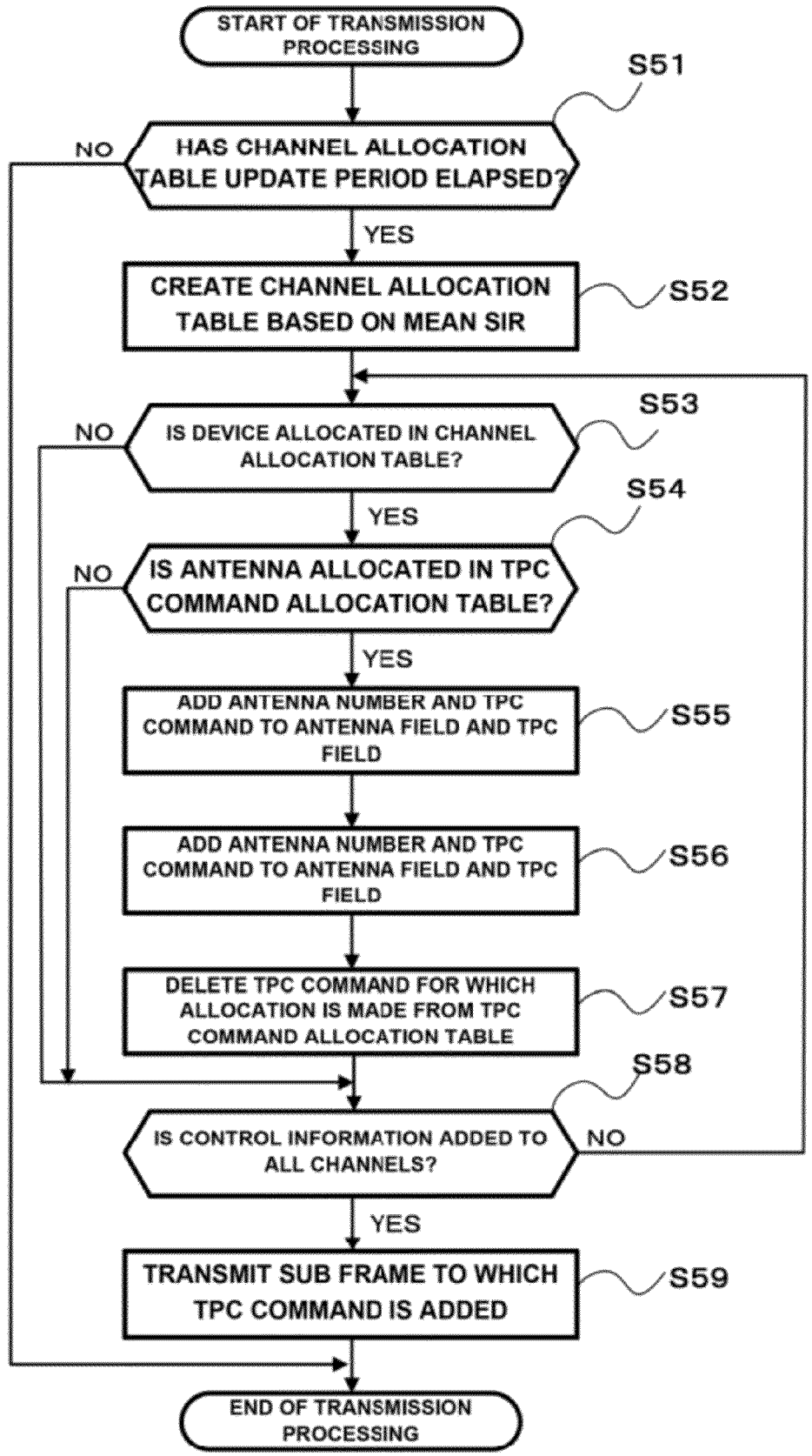
FIG. 13 is a flowchart that illustrates transmission processing according to the first exemplary embodiment.

FIG. 13 is a flowchart that illustrates transmission processing. Referring to FIG. 13, transmitter 17 determines whether or not a channel allocation table update period (1 millisecond) has elapsed from a time when a TPC command is initially created or from a time when the previous TPC command is transmitted (step S51).

If an update period (for example, 1 millisecond) of channel allocation table 157 has elapsed (step S51: YES), transmitter 17 creates and stores channel allocation table 157 based on the mean value of the SIR of each mobile communication device (step S52). Transmitter 17 selects any channel among the plurality of channels provided in the sub frame. Transmitter 17 determines whether or not a mobile communication device is allocated for the selected channel in channel allocation table 157 (step S53). If a mobile communication device has been allocated for the selected channel (step S53: YES), transmitter 17 refers to TPC command allocation table 159 to determine whether or not an antenna is allocated for that time (step S54).

If an antenna is allocated (step S54: YES), transmitter 17 stores information showing the allocated "antenna number" in the antenna field, and stores a TPC command in the TPC field (step S55).

Transmitter 17 deletes the device with respect to which the allocation has been made from channel allocation table 157 (step S56), and deletes the TPC command with respect to which the allocation has been made from TPC command allocation table 159 (step S57).

When a mobile communication device is not allocated for the selected channel (step S53: NO) or when an antenna is not allocated for that time (step S54: NO), or after step S57, transmitter 17 determines whether or not control information has been added to all the channels (step S58). If control information has not been added to all the channels (step S58: NO), transmitter 17 returns to step S53.

If control information has been added to all the channels (step S58: YES), transmitter 17 transmits sub frame 171 in which an antenna field and a TPC field have been set to the mobile communication devices (step S59). In a case in which an update period (1 millisecond) of channel allocation table 157 has not elapsed (step S51: NO), or after step S59, transmitter 17 ends the transmission processing.

Figure 14:
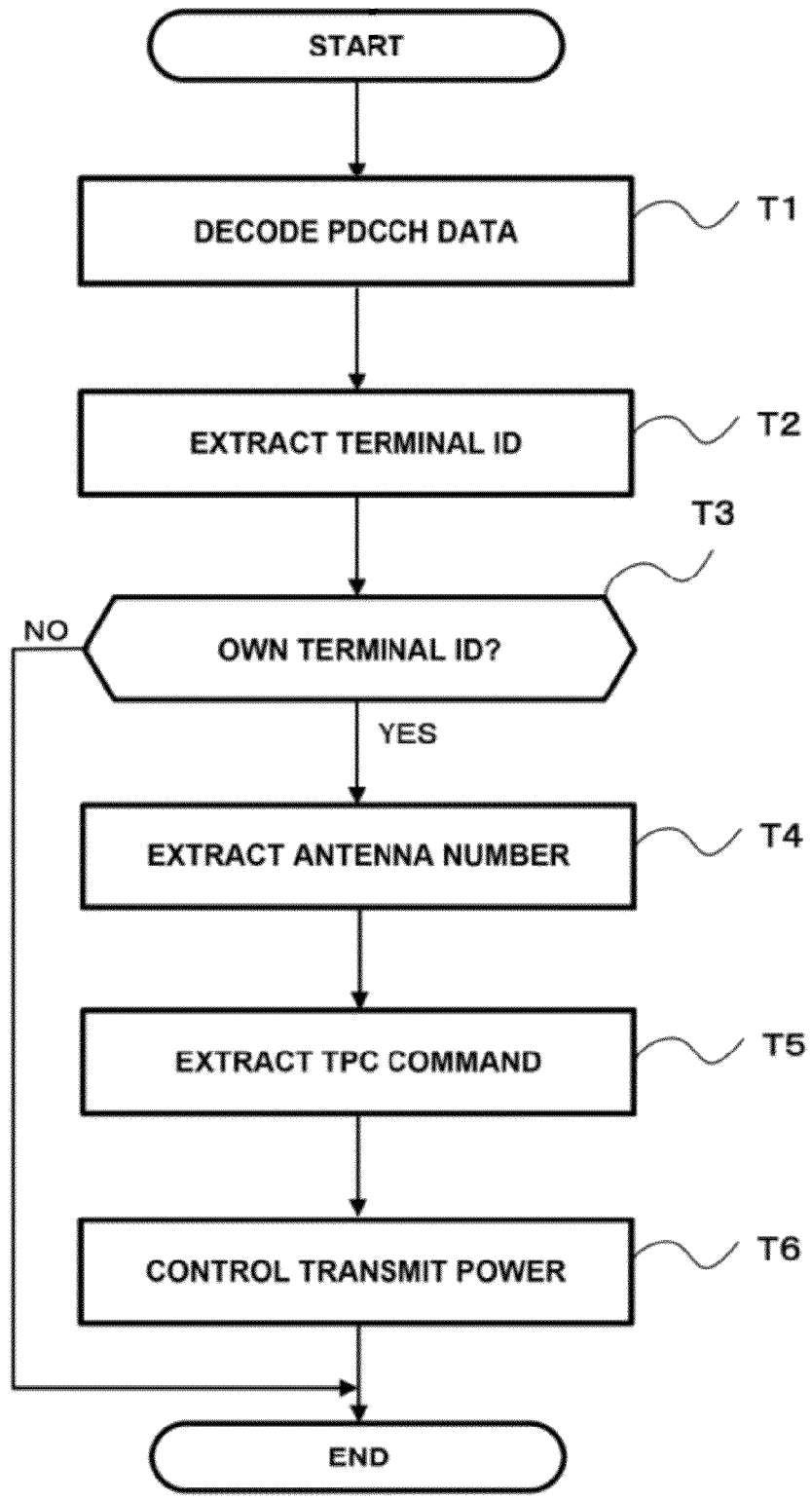
FIG. 14 is a flowchart that illustrates reception control processing according to the first exemplary embodiment.

FIG. 14 is a flowchart that illustrates reception control processing that is executed by mobile communication device 20. The transmit power control processing starts when mobile communication device 20 receives sub frame 171 from base station apparatus 10.

Referring to FIG. 14, PDCCH decoder 205 decodes control information that is received via the PDCCH (UL) from base station apparatus 10 (step T1). Terminal ID extractor 206 extracts information showing the terminal ID from the decoded control information (step T2), and determines whether or not the terminal ID is an ID that corresponds to mobile communication device 20 (step T3).

If the terminal ID is an ID corresponding to mobile communication device 20 (step T3: YES), antenna number extractor 207 extracts information corresponding to the antenna field from the decoded control information, and obtains antenna numbers (step T4). Subsequently, TPC command extractor 208 extracts information corresponding to the TPC field from the decoded control information, and extracts a TPC command for each antenna (step T5). Transmit power controller 209 increases or decreases the transmit power of each antenna (201, 203) in accordance with the TPC command for each antenna (step T6).

When the terminal ID is not an ID that corresponds to mobile communication device 20 (step T3: NO), or after step T6, transmitter 17 ends the transmission processing.

As described above, according to the present exemplary embodiment base station apparatus 10 calculates an SIR for each of a plurality of antennas of mobile communication devices 20 and 21. Base station apparatus 10 transmits a TPC command for making a calculated value equal to a predetermined target value in a manner that gives priority to control information corresponding to a reception signal for which an absolute value of a difference between an individual SIR measurement value and a target value is large. Therefore, even in a case in which the control amount, by which the transmit power of an antenna will be increased or decreased in order to the transmit power of an antenna for which a control amount is large is controlled with priority on the transmitting side. As a result, separation of reception signals for each antenna is facilitated on the receiving side, and the communication quality of transmission channels corresponding to the antennas is improved.

By making a transmission period of a TPC command (channel allocation table update period) shorter than a TPC update period, base station apparatus 10 can control the transmit power of a plurality of antennas in the TPC update period.

Further, since base station apparatus 10 cancels a TPC command that could not be transmitted, the control is not delayed due to transmission of a TPC command that has been calculated the previous time.

Second Exemplary Embodiment

Figure 15:
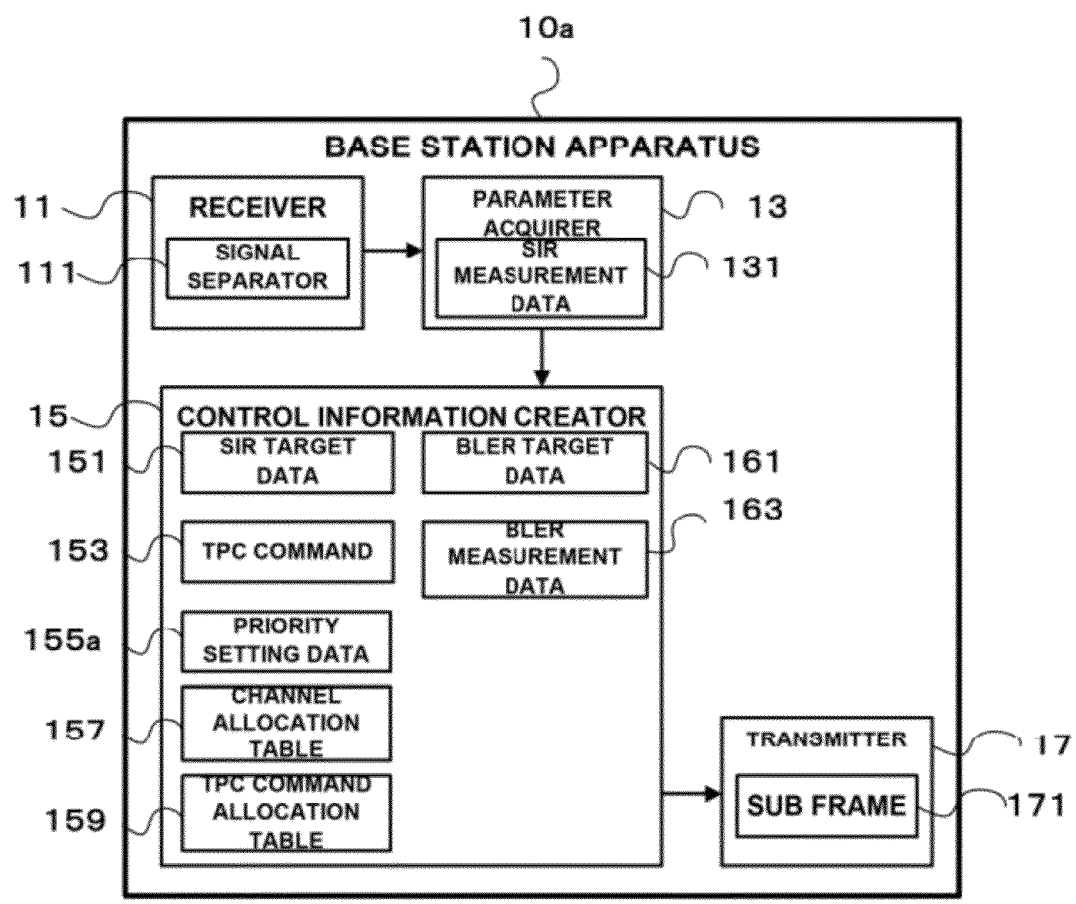
FIG. 15 is a block diagram that shows the configuration of a base station apparatus according to a second exemplary embodiment.

A second exemplary embodiment will now be described referring to FIG. 15 to FIG. 20. FIG. 15 is a block diagram that shows the configuration of base station apparatus 10a according to the present exemplary embodiment. Referring to FIG. 15, base station apparatus 10a has the same configuration as base station apparatus 10 of the first exemplary embodiment, except that control information creator 15 previously stores BLER target data 161 in addition to SIR target data 151, creates BLER measurement data 163, and creates priority setting data 155a in place of priority setting data 155.

According to the first exemplary embodiment, control information creator 15 only performs transmit power control (inner loop transmit power control) so that the SIR measurement value (131) becomes equal to the target value (151).

In contrast, according to the present exemplary embodiment, control information creator 15 calculates a BLER (BLock Error Rate) value that is a parameter that shows the reception quality, for each signal that is separated by signal separator 111. Control information creator 15 stores information showing calculated BLER values as BLER measurement data 163. Further, control information creator 15 calculates an SIR target value (151) for each antenna so that the calculated BLER (163) becomes equal to a target value (161). Control information creator 15 performs transmit power control (outer loop transmit power control) so that the SIR measurement value (131) becomes equal to the target value (151).

In this case, measurement of a BLER value is performed at periods (for example, from several hundred milliseconds to several seconds) that are longer to a certain extent than the TPC update period (1 millisecond).

In this connection, a parameter used for transmit power control by base station apparatus 10 is not limited to a BLER value, and base station apparatus 10 may perform transmit power control using other parameters such as a BER (Bit Error Rate), as long as the parameter shows the reception quality.

Control information creator 15 creates priority setting data 155a so as to give priority to control information corresponding to an antenna for which the difference between a BLER measurement value (163) and a target value (161) is large.

FIG. 16 is a view that shows an example of the structure of BLER target data 161. Referring to FIG. 16, BLER target data 161 includes information that shows a "terminal ID", "antenna number", and "BLER target value".

Figure 17:
FIG. 17 is a view that shows an example of the structure of BLER measurement data according to the second exemplary embodiment.

FIG. 17 is a view showing an example of the structure of BLER measurement data 163. Referring to FIG. 17, BLER measurement data 163 includes information that shows a "terminal ID", "antenna number", and "BLER measurement value".

In FIG. 16 and FIG. 17, the "terminal ID" is a number that is uniquely allocated for each mobile communication device, and the "antenna number" is a number that is uniquely allocated for each antenna. The "BLER target value" is a target value for BLER for each antenna, and is set based on a service quality in a path corresponding to the relevant antenna. The "BLER measurement value" is a BLER value that is calculated for each antenna.

Figure 18:
FIG. 18 is a view that shows an example of the structure of priority setting data according to the second exemplary embodiment.

FIG. 18 is a view that shows an example of the structure of priority setting data 155a. Referring to FIG. 18, priority setting data 155a includes information that shows an "antenna number", "BLER difference", and "antenna priority".

The "antenna number" is a number that is uniquely allocated for each antenna. The "BLER difference" is an absolute value of a difference between a BLER and a target value that is calculated for each antenna. The "antenna priority" indicates a priority for each antenna of a single mobile communication device. Regarding the "antenna priority", the higher the "BLER difference", the higher is the priority that is set for the relevant antenna.

The operation of base station apparatus 10a of the present exemplary embodiment will now be described. The transmit power control processing that is executed by base station apparatus 10a is the same as the transmit power control processing of the first exemplary embodiment.

Figure 19:
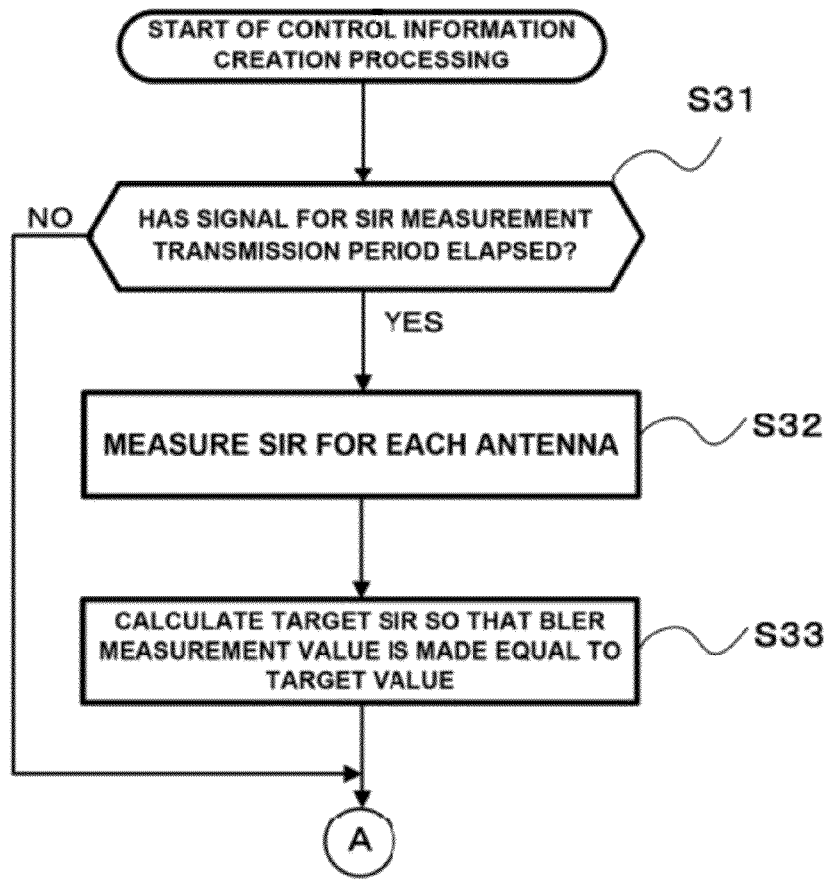
FIG. 19 is a flowchart that illustrates control information creation processing according to the second exemplary embodiment.

FIG. 19 and FIG. 20 are flowcharts that illustrate the control information creation processing of the present exemplary embodiment. Referring to FIG. 19 and FIG. 20, control information creator 15 determines whether or not an update period (for example, 1 second) of an SIR target value has elapsed since reception signals were initially separated or since updating of the SIR the previous time (step S31). If the SIR update period has elapsed (step S31: YES), control information creator 15 calculates the BLER for each antenna. Control information creator 15 stores information showing the BLER for each antenna as BLER measurement data 163 (step S32). Control information creator 15 calculates an SIR target value for each antenna so that the calculated BLER (163) becomes equal to the target value (161). Control information creator 15 stores information showing the SIR for each antenna as SIR target data 151 (step S33).

When an SIR update period has not elapsed (step S31: NO), or after step S33, if a transmission period of a signal for SIR measurement has elapsed (step S35: YES), control information creator 15 measures the SIR for each antenna (step S36). Control information creator 15 calculates a mean value for the SIR for each mobile communication device (step S37), and each time a TPC update period elapses (step S38: YES), control information creator 15 creates a TPC command for each antenna (step S39).

Control information creator 15 creates priority setting data 155a based on a difference between a BLER measurement value and a target value (step S40a), and creates TPC command allocation table 159 in accordance with the priorities (step S41).

As described above, according to the present exemplary embodiment, since a TPC command corresponding to an antenna for which a difference between a BLER measurement value and a target value is large is transmitted with priority, a delay in the control of an antenna, for which a transmit power control amount that is based on a parameter (BLER) as a communication quality is large, is eliminated.

Third Exemplary Embodiment

Figure 21:
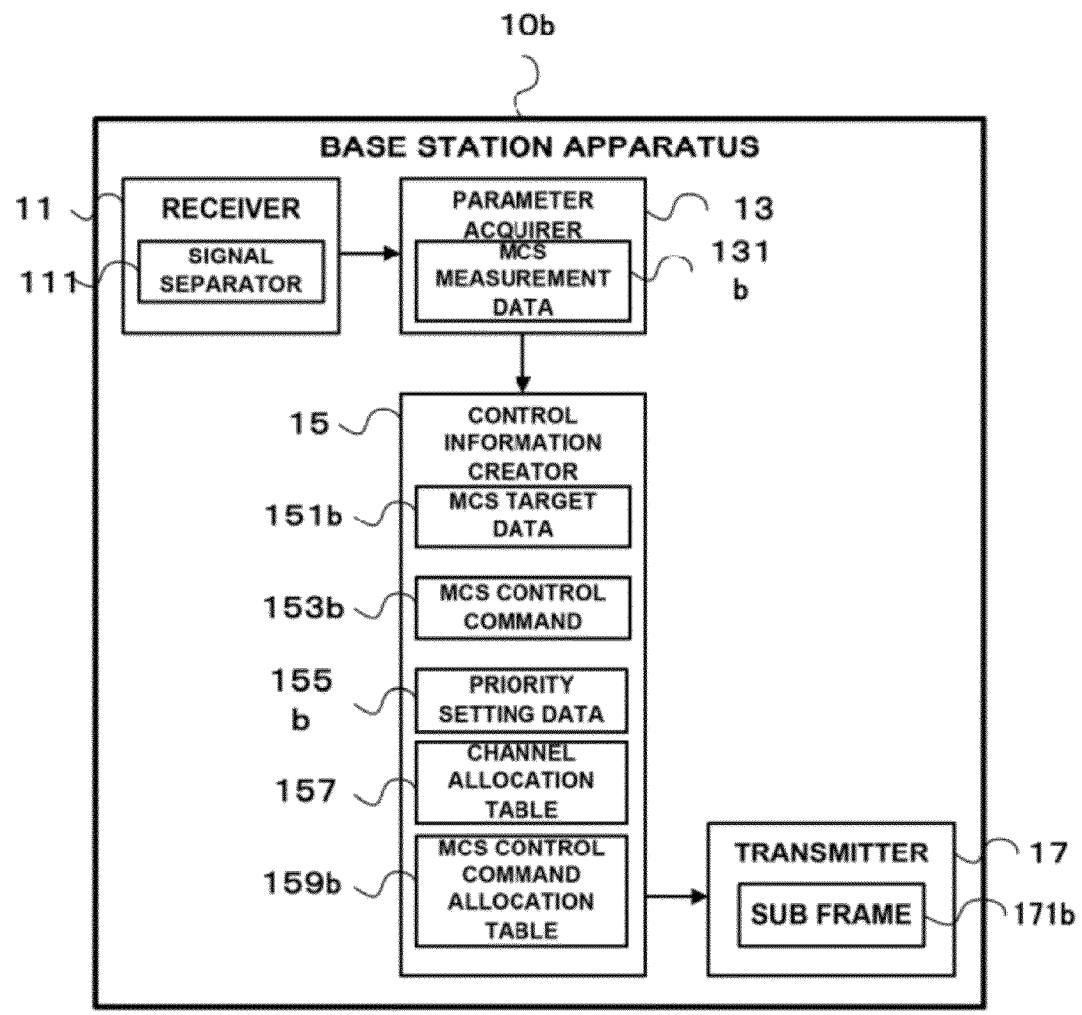
FIG. 21 is a block diagram that shows the configuration of a base station apparatus according to a third exemplary embodiment.

A third exemplary embodiment will now be described referring to FIG. 21 to FIG. 31. FIG. 21 is a flowchart that shows the configuration of base station apparatus 10b according to the present exemplary embodiment. Referring to FIG. 21, base station apparatus 10b has the same configuration as base station apparatus 10 of the first exemplary embodiment, except that base station apparatus 10b acquires MCS measurement data 131b with parameter acquirer 13 and, with control information creator 15, stores MCS target data 151b, adds channel allocation table 157, and creates MCS control command 153b, priority setting data 155b, and MCS command allocation table 159b.

Parameter acquirer 13 acquires an MCS (Modulation and Coding Scheme) number for each antenna based on each signal that is separated by signal separator 111. The MCS number is a number that indicates a combination between a modulation scheme and a coding rate.

FIG. 22 is a view that shows an example of the correlation between MCS numbers, modulation schemes, coding rates, and transfer rates. Referring to FIG. 22, the higher the transfer rate of a combination, the higher is the number that is set for the MCS number.

For example, an MCS number corresponding to a combination in which the modulation scheme is "QPSK (Quadrature Phase Shift Keying)" and in which the coding rate is "⅛", is set as "1".

For each mobile communication device, control information creator 15 stores information showing target values of MCS numbers for each antenna as MCS target data 151b. Control information creator 15 creates and stores MCS control command 153b that designates a target value of an MCS number for each antenna. Further, control information creator 15 creates priority setting data 155b so as to raise the priority of an antenna and mobile communication device for which an absolute value of a difference between a measurement value of an MCS number and a target value is large. Control information creator 15 creates channel allocation table 157 and MCS command allocation table 159b in accordance with the priorities.

Transmitter 17 transmits sub frame 171b including an MCS control command in accordance with MCS command allocation table 159b.

Figure 23:
FIG. 23 is a view that illustrates an example of the structure of MCS measurement data according to the third exemplary embodiment.

FIG. 23 is a view that shows an example of the structure of MCS measurement data 131b. Referring to FIG. 23, MCS measurement data 131b includes information showing a "terminal ID", "antenna number", and "MCS measurement value".

The "terminal ID" is a number that is uniquely allocated to each mobile communication device. The "antenna number" is a number that is uniquely allocated to each antenna. The "MCS measurement value" is the measurement value of an MCS number for each antenna.

Figure 24:
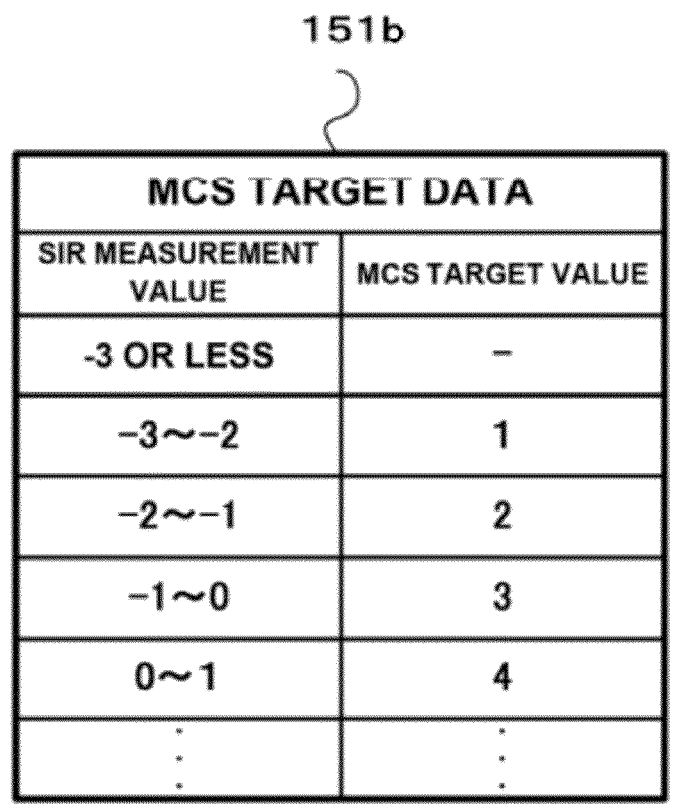
FIG. 24 is a view that illustrates an example of the structure of MCS target data according to the third exemplary embodiment.

FIG. 24 is a view that shows an example of the structure of MCS target data 151b. Referring to FIG. 24, MCS target data 151b includes information showing an "SIR measurement value" and an "MCS target value".

The "SIR measurement value" is a measurement value of an SIR. The "MCS target value" is a target value that is set according to the SIR measurement value. For example, the higher the SIR measurement value, the higher is the MCS target value that is set.

FIG. 25 is a view that shows an example of the structure of priority setting data 155b. Referring to FIG. 25, priority setting data 155b includes information showing an "antenna number", "MCS difference", and "antenna priority".

The "MCS difference" is an absolute value of the difference between a measurement value of an MCS number and a target value for each antenna. The "antenna priority" is a priority for each antenna in a single mobile communication device.

Figure 26:
FIG. 26 is a view that shows an example of the structure of an MCS command allocation table according to the third exemplary embodiment.

FIG. 26 is a view that shows an example of the structure of MCS command allocation table 165. Referring to FIG. 26, MCS command allocation table 165 includes information showing a "terminal ID", "antenna priority", "transmitting antenna number", and an "MCS control command".

The "antenna priority" shows a priority for each antenna of a single mobile communication device. The "transmitting antenna number" shows the number of the antenna that is the object of transmission. The "MCS control command" is information for designating the target value of an MCS number.

Figure 27:
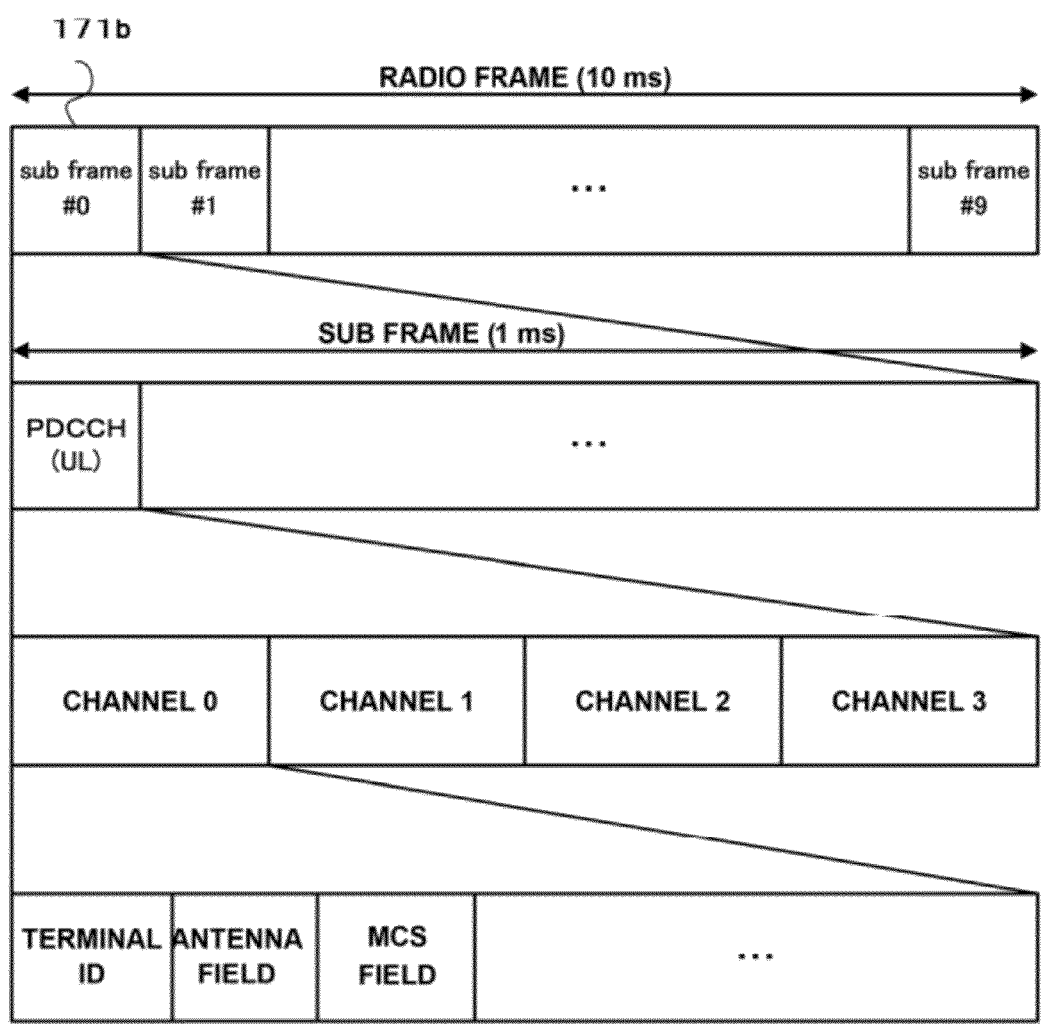
FIG. 27 is a view thatshows the format of a radio frame according to the third exemplary embodiment.

FIG. 27 is a view that shows the format of a radio frame according to the present exemplary embodiment. Referring to FIG. 27, the radio frame is time-divided into sub frames 173. In a PDCCH (UL) of sub frame 173 is stored information showing a terminal ID, and an antenna field and an MCS field are also provided. An MCS control command is stored in the MCS field.

Figure 28:
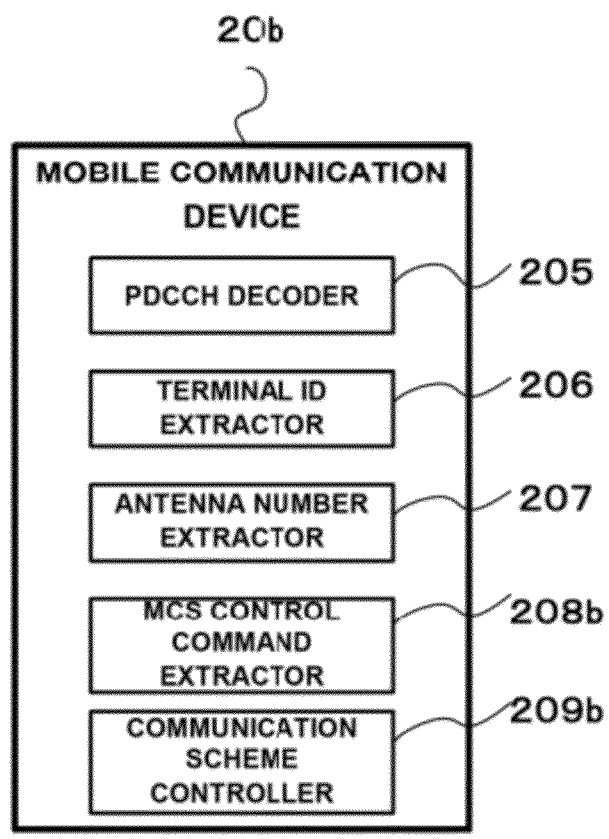
FIG. 28 is a block diagram that shows the configuration of a mobile communication device according to the third exemplary embodiment.

FIG. 28 is a block diagram that shows the configuration of mobile communication device 20b of the present exemplary embodiment. Referring to FIG. 28, mobile communication device 20b has the same configuration as mobile communication device 20 of the first exemplary embodiment, except that mobile communication device 20b includes MCS control command extractor 208b and communication scheme controller 209b instead of TPC command extractor 208 and transmit power controller 209.

MCS control command extractor 208b extracts information corresponding to the MCS field from decoded control information to extract an MCS control command for each antenna.

Communication scheme controller 209b changes the communication scheme (modulation scheme and coding rate) of each antenna according to the MCS control command.

Mobile communication device 21b has the same configuration as mobile communication device 20b.

Figure 29:
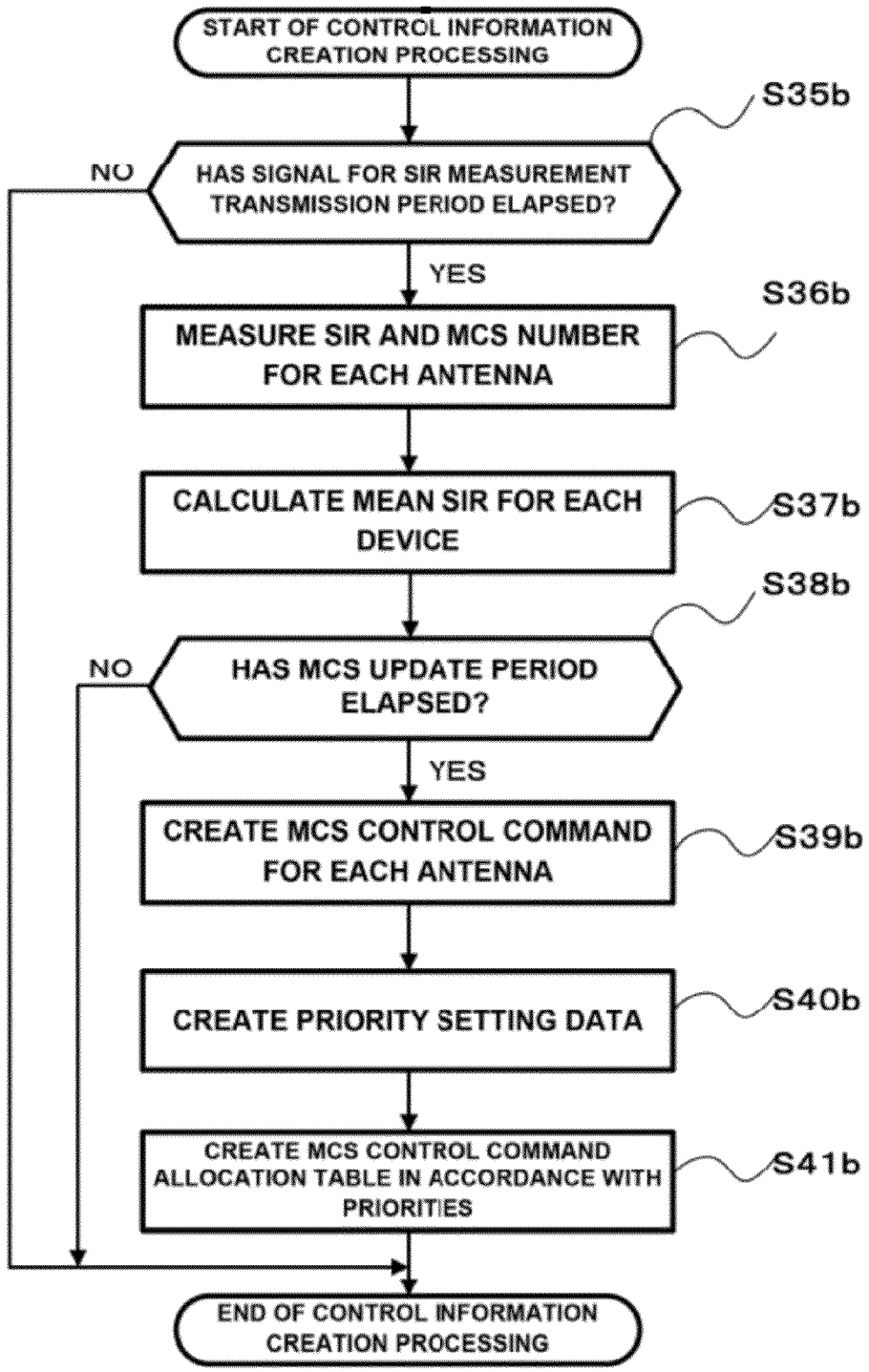
FIG. 29 is a flowchart that illustrates control information creation processing according to the third exemplary embodiment.

FIG. 29 is a flowchart that illustrates control information creation processing executed by base station apparatus 10b. Parameter acquirer 13 determines whether or not a transmission period (1 millisecond) of a signal for SIR measurement has elapsed from the time that reception signals are initially separated or from the time of the previous measurement (step S35). If a transmission period of the signal for SIR measurement has elapsed (step S35: YES), parameter acquirer 13 calculates an SIR and an MCS number for each antenna from the separated signals (step S36b), and calculates a mean value of the SIR for each device (step S37b).

Control information creator 15 determines whether or not an MCS update period (2 milliseconds) has elapsed (step S38b). If the MCS update period has elapsed (step S38b: YES), control information creator 15 reads out an MCS target value corresponding to the SIR measurement value from MCS target data 151b. Control information creator 15 creates MCS control command 153b that designates the target value that is read out (step S39b). Control information creator 15 creates priority setting data 155b based on the absolute value of the difference between the measurement value of an MCS number and the target value (step S40b). Control information creator 15 creates MCS command allocation table 159b in accordance with the priorities (step S41b).

When a transmission period of a signal for SIR measurement has not elapsed (step S35b: NO), an MCS update period has not elapsed (step S38b: NO), or after step S41b, control information creator 15 ends the control information creation processing.

Figure 30:
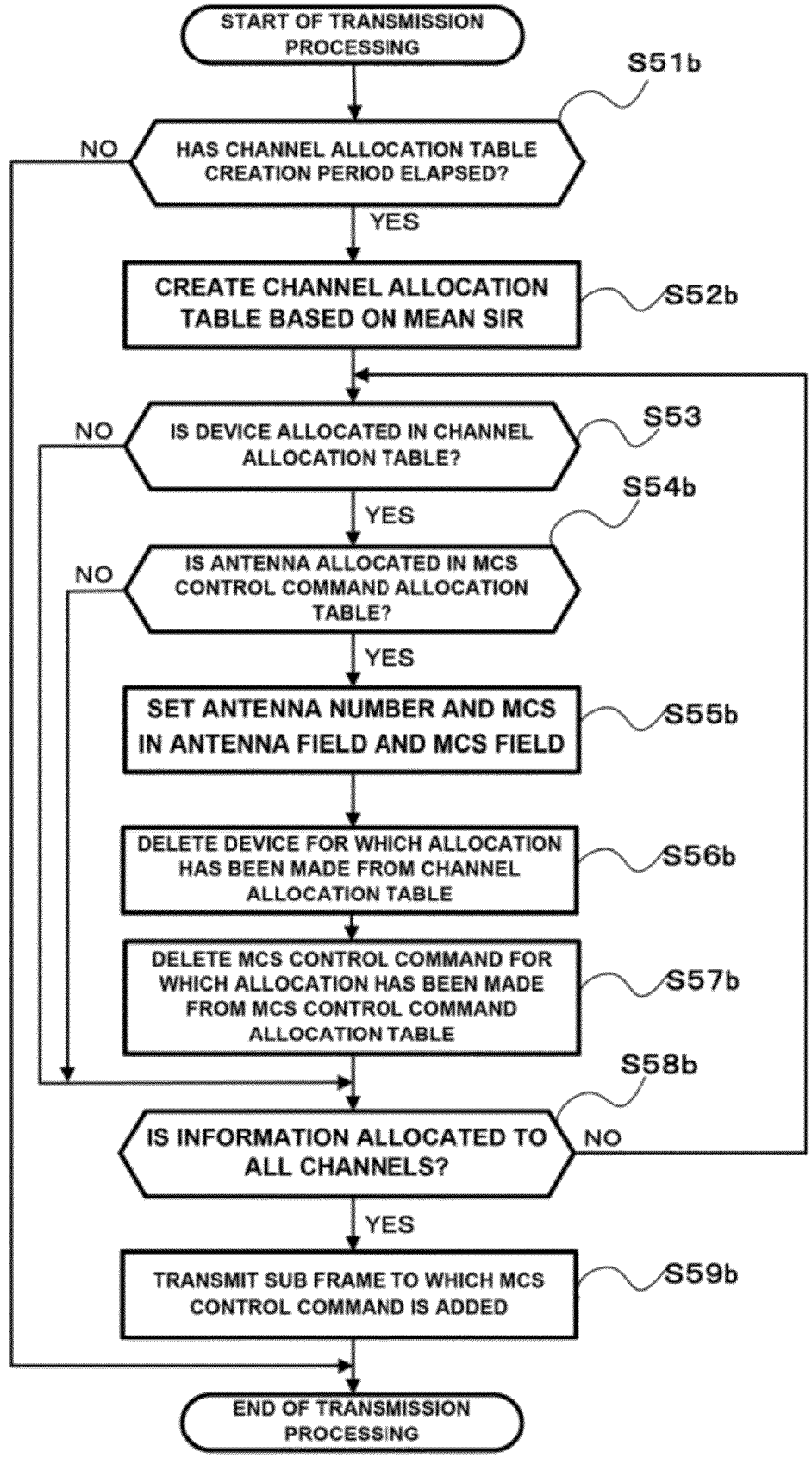
FIG. 30 is a flowchart that illustrates transmission processing according to the third exemplary embodiment.

FIG. 30 is a flowchart that illustrates transmission processing according to the present exemplary embodiment. Referring to FIG. 30, transmitter 17 determines whether or not a channel allocation table update period (1 millisecond) has elapsed from the time when an MCS control command is initially created or from a time when the previous MCS control command is transmitted (step S51b).

If an update period (1 millisecond) of channel allocation table 157 has elapsed (step S51b: YES), transmitter 17 creates and stores channel allocation table 157 based on the mean SIR value of each mobile communication device (step S52b). Transmitter 17 selects any channel and determines whether or not a mobile communication device has been allocated for the selected channel in channel allocation table 157 (step S53). If a mobile communication device has been allocated for the selected channel (step S53: YES), transmitter 17 determines whether or not an antenna has been allocated for that time in MCS control command allocation table 159b (step S54b).

If an antenna has been allocated (step S54b: YES), transmitter 17 adds information showing the allocated "antenna number" in the antenna field, and adds an MCS control command in the MCS field (step S55b).

Transmitter 17 deletes the device for which the allocation has been made from channel allocation table 157 (step S56b), and deletes the MCS control command for which the allocation has been made from MCS control command allocation table 159b (step S57b).

When a mobile communication device is not allocated for the selected channel (step S53: NO) or when an antenna is not allocated for that time (step S54b: NO), or after step S57b, transmitter 17 determines whether or not control information has been added to all the channels (step S58b). If control information has not been added to all the channels (step S58b: NO), transmitter 17 returns to step S53.

If control information has been added to all the channels (step S58b: YES), transmitter 17 transmits sub frame 171b in which an antenna field and an MCS field have been set to the mobile communication device (step S59b). In a case in which an update period (1 millisecond) of channel allocation table 157 has not elapsed (step S51b: NO), or after step S59b, transmitter 17 ends the transmission processing.

Figure 31:
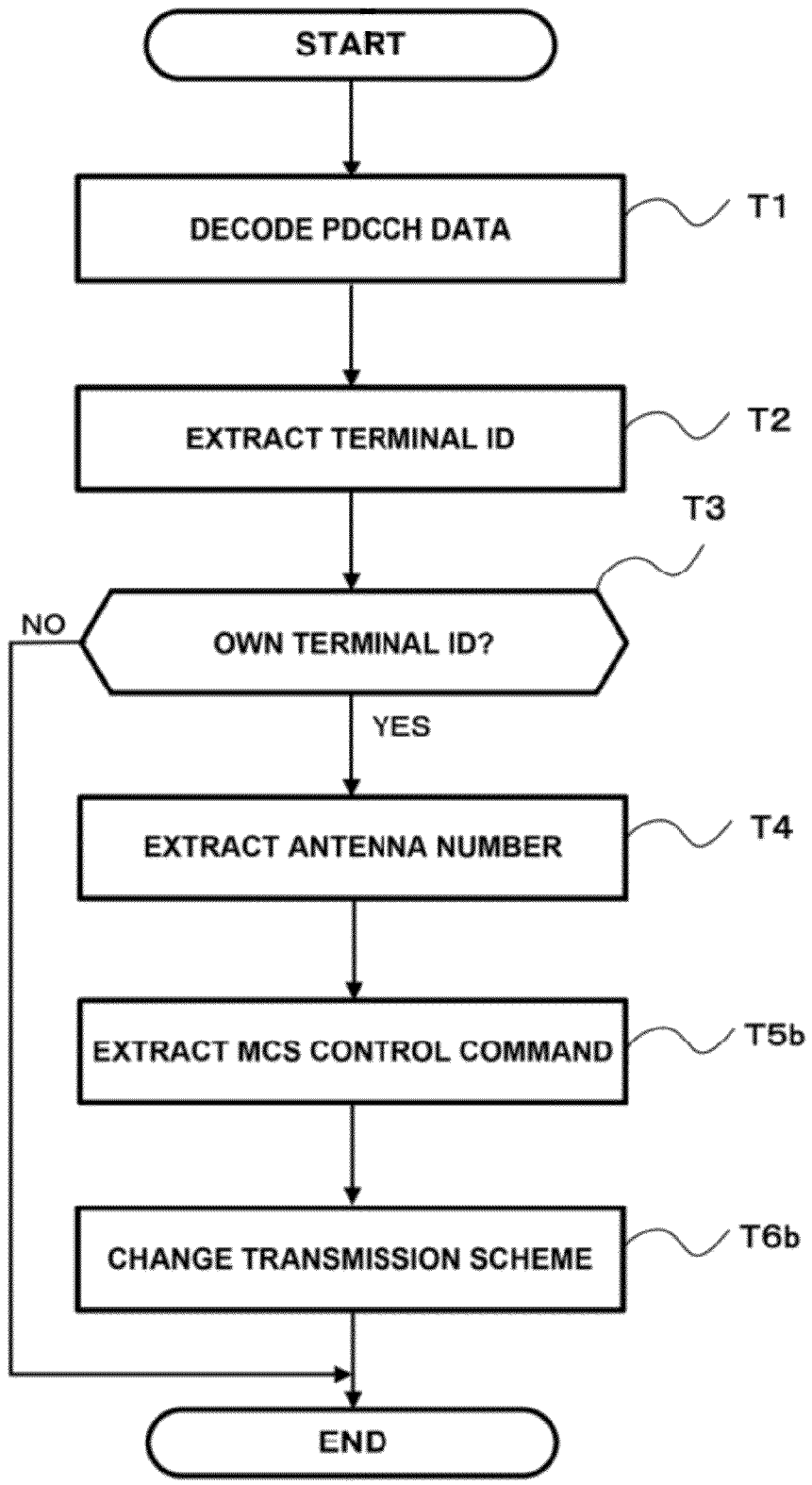
FIG. 31 is a flowchart that illustrates reception control processing according to the third exemplary embodiment.

FIG. 31 is a flowchart that illustrates reception control processing that is executed by mobile communication device 20b. Referring to FIG. 31, the reception control processing of the present exemplary embodiment is the same as the reception control processing of the first exemplary embodiment, except that steps T5b and T6b are executed instead of steps T5 and T6.

If the terminal ID is an ID corresponding to mobile communication device 20b (step T3: YES), MCS control command extractor 208b extracts information corresponding to the antenna field and the MCS field from the decoded control information, and extracts an MCS control command for each antenna (step T5b). Communication scheme controller 209b controls the communication scheme (modulation scheme and coding rate) of each antenna in accordance with the MCS control command for each antenna (step T6b).

In this connection, a configuration may also be adopted in which base station apparatus controls only a coding rate, and not an MCS number, of a mobile communication device.

As described above, according to the present exemplary embodiment, base station apparatus 10b transmits with priority an MCS control command corresponding to an antenna for which the absolute value of the difference between the measurement value of an MCS number and the target value is large. Therefore, a delay in the control of an antenna for which there is a relatively large change in a communication scheme is eliminated, and the communication quality is improved.

Fourth Exemplary Embodiment

Figure 32:
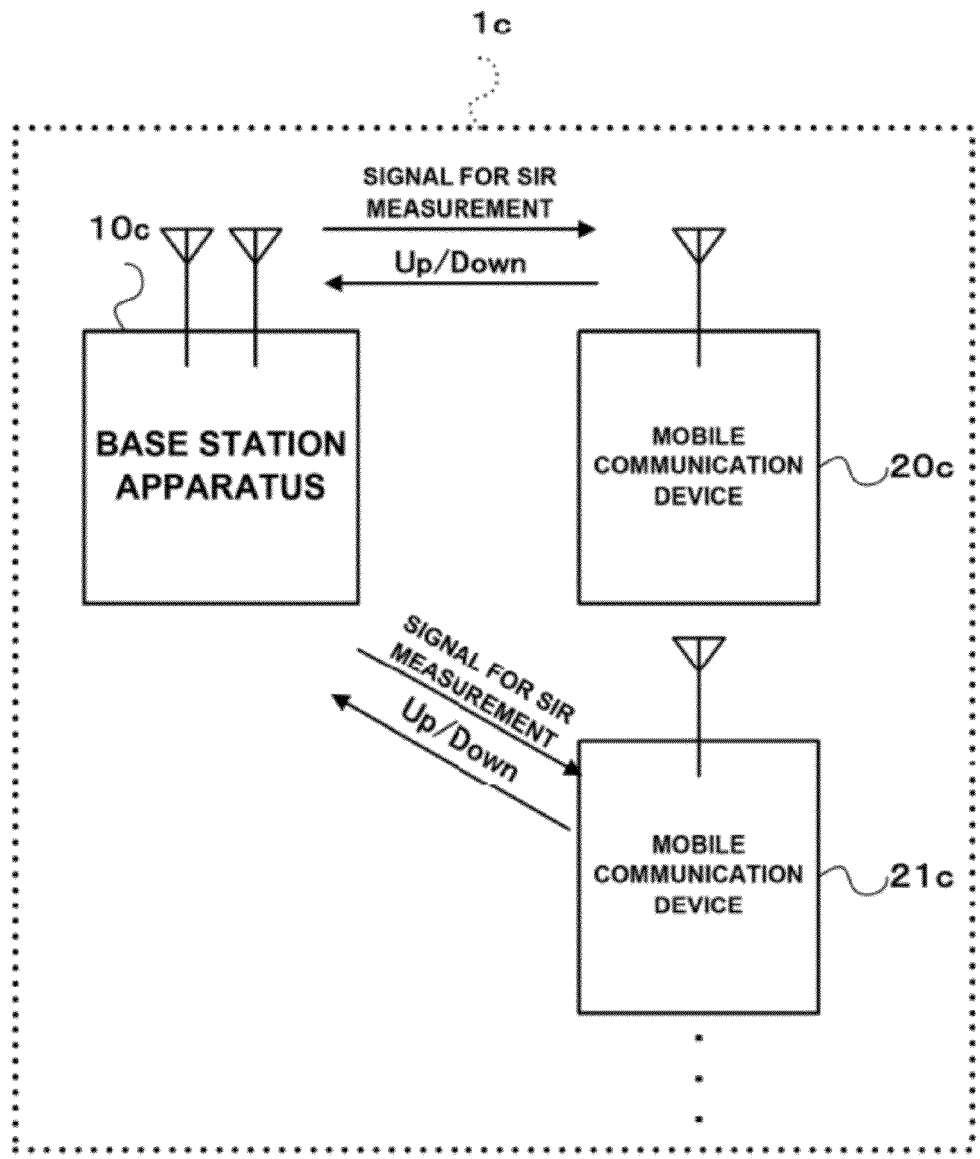
FIG. 32 is a block diagram that shows the configuration of an MIMO system according to a fourth exemplary embodiment.

A fourth exemplary embodiment will now be described referring to FIG. 32. FIG. 32 is a view that illustrates the configuration of MIMO system 1a according to the present exemplary embodiment. Referring to FIG. 32, MIMO system 1a includes base station apparatus 10c and mobile communication devices 20c and 21c. Base station apparatus 10c includes two or more transmitting antennas, and mobile communication devices 20c and 21c include one transmitting antenna, respectively. The present exemplary embodiment differs from the first exemplary embodiment in the respect that the number of antennas used for transmission by the base station apparatus and the mobile communication devices is different from the number of antennas according to the first exemplary embodiment.

The configuration and operation of base station apparatus 10c are the same as the configuration and operation of mobile communication devices 20 and 21 of the first exemplary embodiment. The configuration and operation of mobile communication devices 20c and 21c are the same as the configuration and operation of base station apparatus 10 of the first exemplary embodiment.

That is, according to the present exemplary embodiment, base station apparatus 10c transmits a signal for SIR measurement to mobile communication devices 20c and 21c. Based on the SIR, mobile communication devices 20c and 21c control the transmit power of base station apparatus 10c for each antenna.

According to the present exemplary embodiment, a mobile communication device can improve the reception quality of a signal that is received from the base station apparatus.

In this connection, when both the base station apparatus and the mobile communication device include a plurality of transmitting antennas, naturally the base station apparatus and the mobile communication device may both mutually perform transmit power control and MCS number control.

Naturally, a part or all of the processing illustrated in FIG. 12 to FIG. 14, FIG. 19, FIG. 20, and FIG. 29 to FIG. 31 may be implemented by execution of a computer program.

The above and other objects, features, and advantages of the present invention will become apparent from the following description with references to the accompanying drawings which illustrate examples of the present invention.

What is claimed is:

1. A communication system comprising a first radio communication apparatus and a second radio communication apparatus that includes a plurality of antennas, wherein:
the first radio communication apparatus receives transmission signals that are transmitted from the plurality of antennas as reception signals, acquires a predetermined parameter for each of the antennas based on the reception signals, creates control information for causing the second radio communication apparatus to control the transmission signals so that the parameter becomes a predetermined target value for each of the antennas, compares absolute values of differences between each of the parameters that are acquired and the target value, and transmits control information corresponding to the reception signal for which the absolute value is large to the second radio communication apparatus with priority over control information corresponding to the reception signal for which the absolute value is small;
the second radio communication apparatus receives the control information from the first radio communication apparatus, and controls a transmission signal of an antenna that is specified with the control information in accordance with an instruction of the control information;
the first radio communication apparatus creates the control information for each of the antennas at predetermined periods, and transmits one or more pieces of the control information to the second radio communication apparatus within the period; and
if a number of pieces of the control information that can be transmitted within the period is less than a number of pieces of the control information that are created, the first radio communication apparatus transmits only a number of pieces of the control information that can be transmitted within the period by giving priority to the control information corresponding to the reception signals for which the absolute value is large among the control information that are created, and cancels the remainder.

2. The communication system according to claim 1, wherein the parameter is a signal to interference power ratio of the reception signal.

3. The communication system according to claim 1, wherein the parameter is a parameter that fluctuates in accordance with a service quality of a line corresponding to the reception signal.

4. The communication system according to claim 1, wherein the control information is information that designates a control amount by which a transmit power of the transmission signal will be increased or decreased.

5. The communication system according to claim 1, wherein the parameter is a coding rate that is being used for the reception signal.

6. The communication system according to claim 5, wherein the control information is information that designates to the second radio communication apparatus a coding rate to be used for the transmission signal.

7. The communication system according to claim 1, wherein the parameter is a parameter that shows a combination of a modulation scheme and a coding rate that is being used for the reception signal.

8. The communication system according to claim 7, wherein the control information is information that designates to the second radio communication apparatus a combination of a modulation scheme and a coding rate to be used for the transmission signal.

9. A radio communication apparatus, comprising:
receiver that receives transmission signals transmitted from a plurality of antennas comprised by another radio communication apparatus as reception signals;
parameter acquirer that acquires predetermined parameters based on the reception signals received by the reception means for each of the antennas;
control information creator that creates, for each of the antennas, control information for causing the other radio communication apparatus to control the transmission signals so that the parameters acquired by the parameter acquisition means become a predetermined target value; and
transmitter that compares absolute values of differences between each of the parameters that are acquired by the parameter acquirer and the target value, and that transmits control information corresponding to a reception signal for which the absolute value is large to the other radio communication apparatus with priority over control information corresponding to a reception signal for which the absolute value is small,
wherein the control information creator creates the control information for each of the antennas at predetermined periods, and transmits one or more pieces of the control information to the second radio communication apparatus within the period, and
the radio communication apparatus further comprises control information canceller that, when a number of pieces of the control information that can be transmitted within the period by the transmitter is less than a number of pieces of the control information that is created by the control information creator, transmits only a number of pieces of the control information that can be transmitted within the period by giving priority to the control information corresponding to the reception signals for which the absolute value is large among the control information that are created, and cancels the remainder.

10. The radio communication apparatus according to claim 9, wherein the parameter is a signal to interference power ratio of the reception signal.

11. The radio communication apparatus according to claim 9, wherein the parameter is a parameter that fluctuates in accordance with a service quality of a line corresponding to the reception signal.

12. The radio communication apparatus according to claim 9, wherein the control information is information that designates to the other radio communication apparatus a control amount by which a transmit power of the transmission signal will be increased or decreased.

13. The radio communication apparatus according to claim 9, wherein the parameter is a coding rate that is being used for the reception signal.

14. The radio communication apparatus according to claim 13, wherein the control information is information that designates to the other radio communication apparatus a coding rate to be used for the transmission signal.

15. The radio communication apparatus according to claim 9, wherein the parameter is a parameter that shows a combination of a modulation scheme and a coding rate that is being used for the reception signal.

16. The radio communication apparatus according to claim 15, wherein the control information is information that designates to the other radio communication apparatus a combination of a modulation scheme and a coding rate to be used for the transmission signal.

17. A radio communication apparatus, comprising:
reception means for receiving transmission signals transmitted from a plurality of antennas comprised by another radio communication apparatus as reception signals;
parameter acquisition means for acquiring predetermined parameters based on the reception signals received by the reception means for each of the antennas;
control information creation means for creating, for each of the antennas, control information for causing the other radio communication apparatus to control the transmission signals so that the parameters acquired by the parameter acquisition means become a predetermined target value; and
transmission means for comparing absolute values of differences between each of the parameters that are acquired by the parameter acquisition means and the target value, and transmits control information corresponding to a reception signal for which the absolute value is large to the other radio communication apparatus with priority over control information corresponding to a reception signal for which the absolute value is small,
wherein the control information creation means creates the control information for each of the antennas at predetermined periods, and transmits one or more pieces of the control information to the second radio communication apparatus within the period, and
the radio communication apparatus further comprises control information cancellation means that, when a number of pieces of the control information that can be transmitted within the period by the transmission means is less than a number of pieces of the control information that is created by the control information creation means, transmits only a number of pieces of the control information that can be transmitted within the period by giving priority to the control information corresponding to the reception signals for which the absolute value is large among the control information that are created, and cancels the remainder.

18. A communication method for a communication system comprising a first radio communication apparatus and a second radio communication apparatus that includes a plurality of antennas, wherein:
the first radio communication apparatus receives transmission signals that are transmitted from the plurality of antennas as reception signals, acquires a predetermined parameter for each of the antennas based on the reception signals, creates control information for causing the second radio communication apparatus to control the transmission signals so that the parameters become a predetermined target value for each of the antennas, compares absolute values of differences between each of the parameters that are acquired and the target value, and transmits control information corresponding to the reception signal for which the absolute value is large to the second radio communication apparatus with priority over control information corresponding to the reception signal for which the absolute value is small;
the second radio communication apparatus receives the control information from the first radio communication apparatus, and controls a transmission signal of an antenna that is specified with the control information in accordance with an instruction of the control information;
the first radio communication apparatus creates the control information for each of the antennas at predetermined periods, and transmits one or more pieces of the control information to the second radio communication apparatus within the period; and
if a number of pieces of the control information that can be transmitted within the period is less than a number of pieces of the control information that are created, the first radio communication apparatus transmits only a number of pieces of the control information that can be transmitted within the period by giving priority to the control information corresponding to the reception signals for which the absolute value is large among the control information that are created, and cancels the remainder.

* * * * *